(12) United States Patent
McLurkin et al.

(10) Patent No.: US 8,290,619 B2
(45) Date of Patent: Oct. 16, 2012

(54) SYSTEMS AND METHODS FOR DISPERSING AND CLUSTERING A PLURALITY OF ROBOTIC DEVICES

(75) Inventors: James McLurkin, Somerville, MA (US); Jennifer Smith, Cambridge, MA (US)

(73) Assignee: iRobot Corporation, Burlington, MA (US)

( * ) Notice: Subject to any disclaimer, the term of this patent is extended or adjusted under 35 U.S.C. 154(b) by 0 days.

(21) Appl. No.: 12/909,707

(22) Filed: Oct. 21, 2010

(65) Prior Publication Data

US 2011/0035052 A1    Feb. 10, 2011

Related U.S. Application Data

(63) Continuation of application No. 11/130,842, filed on May 17, 2005, now Pat. No. 7,844,364, which is a continuation-in-part of application No. 10/417,401, filed on Apr. 16, 2003, now Pat. No. 7,117,067.

(60) Provisional application No. 60/417,836, filed on Oct. 11, 2002, provisional application No. 60/373,017, filed on Apr. 16, 2002, provisional application No. 60/571,767, filed on May 17, 2004.

(51) Int. Cl.
*G05D 1/00* (2006.01)
(52) U.S. Cl. .................................. 700/245; 294/86.4
(58) Field of Classification Search .................. 700/245, 700/248, 249, 253, 257, 260, 263, 264; 701/1, 701/23–26, 120, 200, 400; 901/1–3, 8–10, 901/23; 318/568.2, 568.11; 294/86.4; 414/1, 414/730
See application file for complete search history.

(56) References Cited

U.S. PATENT DOCUMENTS

| 5,819,008 | A | 10/1998 | Asama et al. |
|---|---|---|---|
| 6,374,155 | B1 | 4/2002 | Wallach et al. |
| 6,408,226 | B1 | 6/2002 | Byrne et al. |
| 6,496,755 | B2 * | 12/2002 | Wallach et al. ............... 700/245 |
| 6,507,771 | B2 | 1/2003 | Payton et al. |
| 6,560,512 | B1 * | 5/2003 | Rosen et al. .................. 700/258 |
| 6,577,906 | B1 | 6/2003 | Hurtado et al. |
| 6,687,571 | B1 | 2/2004 | Byrne et al. |
| 6,763,282 | B2 * | 7/2004 | Glenn et al. .................. 700/245 |
| 6,877,574 | B2 | 4/2005 | Thompson et al. |
| 6,925,679 | B2 * | 8/2005 | Wallach et al. ................. 15/319 |
| 7,013,201 | B2 | 3/2006 | Hattori et al. |
| 7,117,067 | B2 | 10/2006 | McLurkin et al. |
| 7,254,464 | B1 | 8/2007 | McLurkin et al. |

(Continued)

OTHER PUBLICATIONS

"Gift Boxes," The Boston Herald, Feb. 27, 2003, 1 page.

(Continued)

*Primary Examiner* — Dalena Tran
(74) *Attorney, Agent, or Firm* — Goodwin Procter LLP

(57) ABSTRACT

The present invention features methods for operating, such as methods for dispersing and clustering, robotic devices (i.e., "robots") that employ adaptive behavior relative to neighboring robots and external (e.g., environmental) conditions. Each robot is capable of receiving, processing, and acting on one or more multi-device primitive commands that describe a task the robot will perform in response to other robots and the external conditions. The commands facilitate a distributed command and control structure, relieving a central apparatus or operator from the need to monitor the progress of each robot. This virtually eliminates the corresponding constraint on the maximum number of robots that can be deployed to perform a task (e.g., data collection, mapping, searching, dispersion, and retrieval). By increasing the number of robots, the efficiency in completing the task is also increased.

25 Claims, 13 Drawing Sheets

U.S. PATENT DOCUMENTS

| | | |
|---|---|---|
| 2002/0095239 A1 | 7/2002 | Wallach et al. |
| 2003/0171846 A1 | 9/2003 | Murray et al. |
| 2003/0212472 A1 | 11/2003 | McKee |
| 2004/0020000 A1 | 2/2004 | Jones |
| 2004/0093650 A1 | 5/2004 | Martins et al. |
| 2006/0079997 A1 | 4/2006 | McLurkin et al. |

OTHER PUBLICATIONS

"Self-Sustaining Swarm: An Architecture for a Self-Sustaining Robotic Swarm and Distributed Algorithms," Progress Report for Period Aug. 1, 2002 to Nov. 30, 2002, submitted by iRobot Corp., Contract No. DASG60-02-C-0028, pp. 1-10.

"Self-Sustaining Swarm: An Architecture for a Self-Sustaining Robotic Swarm and Distributed Algorithms," Progress Report for Period May 1, 2002 to Jul. 31, 2002, submitted by iRobot Corp., Contract No. DASG60-02-C-0028, pp. 1-10.

"Self-Sustaining Swarm: An Architecture for a Self-Sustaining Robotic Swarm and Distributed Algorithms," Progress Report for Period Nov. 1, 2002 to Jan. 31, 2003, submitted by iRobot Corp., Contract No. DASG60-02-C-0028, pp. 1-8.

Arnold "MIT Student Honored for Robot Design" The Boston Globe, Feb. 27, 2003, pp. B1 and B12.

Berry "Soccer Robots with Local Vision," 1999 Honours Dissertation, The University of Western Australia, Department of Electrical and Electronic Engineering, Oct. 1999, p. 1-69.

Graf "Robot Soccer," Diploma Thesis No. 1700, The University of Western Australia, Department of Electrical and Electronic Engineering, Mar. 31, 1999, pp. 1-96.

Huang et al. "Construction and Soccer Dynamics Analysis for an Integrated Multi-Agent Soccer Robot System," Proc Natl. Sci Counc. ROA(A), vol. 25, No. 4, 2001, pp. 84-93.

Kanda et al. "Development and Evaluation of an Interactive Humanoid Robot, 'Robovie'," Proc. of the 2002 IEEE Int'l. Conf. on Robotics & Automation, Washington, D.C., May 2002, pp. 1848-1855.

Lee et al. "A Robot in Intelligent Environment: Soccer Robot," 1999, IEEE International Conference on Advanced Intelligent Mechanics, Sep. 19-23, 1999 pp. 73-78.

Lumelesky et al. "Decentralized Motion Planning for Multiple Mobile Robots: The Cocktail Party Model," Autonomous Robots, vol. 4, Issue 1, Mar. 1997, pp. 1-22.

Muther, "Tired of Vacuuming? Have a $200 Robot do it Instead," The Boston Globe, Apr. 20, 2003.

Parker "Current State of the Art in Distributed Autonomous Mobile Robotics," Distributed Autonomous Robotic Systems 4 by Parker et al., Springer-Verlag, Tokyo, 2000, pp. 3-12.

Progress, Status, and Management Report, Final Report and Software Algorithm Report, "Software for Disposable Robot Swarms," submitted by iRobot, Inc., Contract No. N66001-99-C-8513, May 31, 2002, pp. 1-44.

Progress, Status, and Management Report, Quarterly Progress Report, "Software for Disposable Robot Swarms," submitted by iRobot, Inc., Contract No. N66001-99-C-8513, Mar. 20, 2001, pp. 1-14.

Shen et al. "Autonomous Soccer Robots," Internet, 1997, 8 pages.

Werger "Cooperation without Deliberation: A Minimal Behavior-based Approach to Multi-robot Teams," Interaction Lab, Department of Computer Science, University of Southern California, Los Angeles, CA, Dec. 15, 1998, pp. 1-33.

Werger et al. "Broadcast of Local Eligibility: Behavior-Based Control for Strongly Cooperative Teams," Proceedings of the Fourth International Conference on Autonomous Agents, 2000, 2 pages.

\* cited by examiner

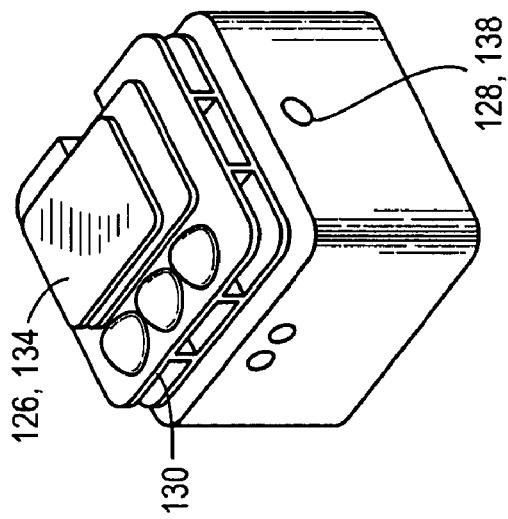
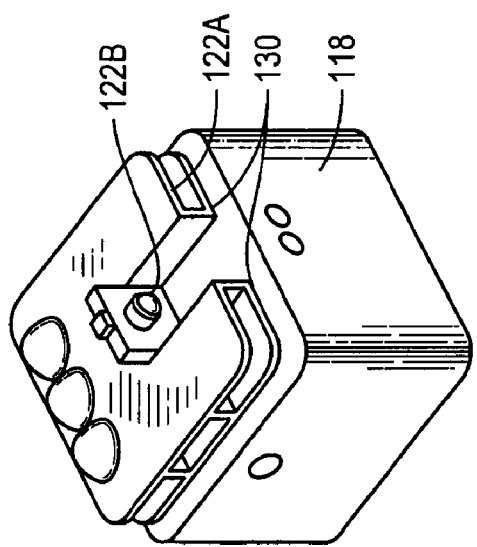
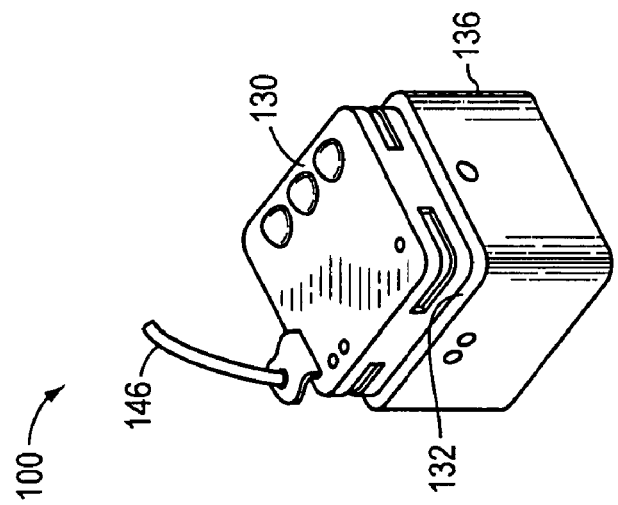

SYSTEMS AND METHODS FOR DISPERSING AND CLUSTERING A PLURALITY OF ROBOTIC DEVICES

CROSS-REFERENCES TO RELATED APPLICATIONS

This application is a continuation of, and claims priority to and the benefit of, U.S. patent application Ser. No. 11/130,842, filed on May 17, 2005, which is a continuation-in-part of U.S. patent application Ser. No. 10/417,401, filed on Apr. 16, 2003, and now U.S. Pat. No. 7,117,067, which claims priority to and the benefit of U.S. Provisional Patent Application Ser. Nos. 60/417,836, filed on Oct. 11, 2002, and 60/373,017, filed on Apr. 16, 2002. U.S. patent application Ser. No. 11/130,842 also claims priority to and the benefit of U.S. Provisional Patent Application Ser. No. 60/571,767, filed on May 17, 2004. The entire disclosures of these five applications are hereby incorporated herein by reference in their entireties.

STATEMENT REGARDING FEDERALLY SPONSORED RESEARCH OR DEVELOPMENT

This invention was made with Government support under:

Contract N66001-99-C-8513 awarded by Space and Naval Warfare Systems Center of the Department of the Navy;

Contract DASG60-02-C-0028 awarded by U.S. Army Space and Strategic Defense Command of the Department of the Army;

Contract DAAD16-00-C-9219 awarded by the U.S. Army Material Command Acquisition Center of the Department of the Army; and Contract DAAH01-02-C-R029 awarded by the U.S. Army Aviation and Missile Command of the Department of the Army.

The Government has certain rights in this invention.

TECHNICAL FIELD

The present invention relates generally to robotic devices and, more specifically, to systems and methods for configuring, monitoring, and controlling one or more robotic devices to complete tasks in a cooperative and autonomous fashion, such as systems and methods for dispersing and clustering a plurality of robotic devices.

BACKGROUND

Robotic devices (i.e., "robots") are capable of performing many tasks, such as data collection, searching, and mapping. Generally, these tasks are defined programmatically using a software development system. One or more robots receive the programmed instructions, execute them, and perform the corresponding tasks. This generally occurs under the auspices of a central command and control apparatus.

When a task is complex or large scale (e.g., mapping a big area), the time to complete the task can be prohibitive if an insufficient number of robots are employed. Consequently, to improve efficiency, more robots are typically added to share the task (or parts of the task) and drive it to completion earlier. A small increase in the number of deployed robots can complicate command and control, but not to the point where the array of robots becomes unmanageable.

Difficulties can ensue when efficient completion of the task requires the deployment of more than just a small number of robots. At this level, the central command and control apparatus typically cannot exercise complete management of the group of robots. Further, a human operator overseeing the robots can be overwhelmed trying to monitor the progress of (and potentially control) every robot. In fact, when working with large numbers of robots, an operator often cannot manually program, charge, or even turn on the robots. Moreover, control strategies for multiple robots need to be robust in the face of complex environments and tolerant to the failure of any number of individual robots within the group. Optimally, a control strategy is designed to be completely scaleable to function with any number of robots.

A robot typically observes its environment during the performance of the task. For example, a robot can sense when it has encountered an obstacle and, optionally, attempt to circumvent the obstacle. When several robots are deployed to complete a task, it is likely they will encounter each other. On the one hand, the robots can simply avoid each other (i.e., to eliminate the potential of collisions) and continue to perform their duties in a virtually independent manner. Nevertheless, efficiency can be improved beyond that attained by increasing the number of robots by allowing the robots to interact with each other and adapt their behavior accordingly, ideally without intervention from a central command and control apparatus or an attending operator (i.e., autonomously).

From the foregoing, it is apparent that there is still a need for a way to allow increasing the number of robots performing a particular task while, at the same time, distributing command and control to, for example, the individual robots. Further, it is desirable to accomplish this in conjunction with allowing interaction between the robots, resulting in the adaptive behavior thereof.

SUMMARY OF THE INVENTION

The present invention provides systems and methods for operating several robotic devices without requiring complete reliance on a central command and control apparatus. To increase efficiency, the number of robots deployed to complete a task may be increased significantly and generally without the concern of overwhelming the command and control structure. Further, the robots are able to interact with each other and adapt their behavior accordingly. This improves efficiency as well.

In one aspect, the invention features a method for operating robots, where one robot receives one or more multi-device primitive commands and data representing the state of a second robot. Either the first or second robot then completes a task (e.g., data collection, mapping, searching, etc.) in response to the command and data. The second robot can transmit the data to the first robot directly, or through a one or more intermediaries. Transmission can occur using any medium (e.g., optical, radio frequency, audible, etc.).

In certain embodiments, the robots include one or more optical sensors, audio sensors, radio frequency receivers, positional sensors, tactile sensors, environmental sensors, and electromagnetic sensors. Consequently, the data representing the state of the second robot can include information obtained from one or more of these elements. Using one or more of an optical transmitter, an audio transmitter, a radio frequency transmitter, a stigmergy transmitter, or a hardwire port, the second robot can send this data to the first robot. Reception is generally accomplished using one or more of an optical receiver, an audio receiver, a radio frequency receiver, or a hardwire port.

In other embodiments, each robot is capable of monitoring its readiness to complete a task. It typically transmits information regarding its readiness to, for example, other robots. Transmission of an out of service message (or a failure to receive any message after a certain interval), generally indicates a disabled robot and typically triggers performance of a different (i.e., "contingency") task to address an operational deficiency or malfunction.

An alternative embodiment features a method for monitoring two or more robots. Typically, each robot has an optical transmitter, or an audio transmitter, or both. The transmitters are configured to emit signals representative of the operational state of the corresponding robot. When a group of robots are present, variations in the signals from robot-to-robot help identify inconsistent behaviors.

In another aspect, the invention features a method for dispersing a plurality of robotic devices. According to this method, a count of neighboring robotic devices is determined for each robotic device, and a relative position with respect to an environmental object is also computed for each robotic device. At least one robotic device is then classified based at least in part on its count of neighboring robotic devices and its relative position with respect to the environmental object. A subset of the plurality of robotic devices is also moved relative to the classified at least one robotic device.

In one embodiment of this aspect of the invention, the at least one robotic device is classified as a front line device based at least in part on the absence of neighboring robotic devices within a region relative to the at least one robotic device. While the count of neighboring robotic devices for the classified front line device is at least one, that at least one neighboring robotic device is located outside the region relative to the classified front line device. The classification of the at least one robotic device as the front line device may also be based at least in part on the environmental object being located outside the region relative to the at least one robotic device and/or a distance between the environmental object and the at least one robotic device exceeding a predetermined value. Classifying the at least one robotic device as the front line device may include considering the environmental object to be a neighboring robotic device. Alternatively, in another embodiment, the at least one robotic device is classified as a perimeter device based at least in part on a distance between the environmental object and the at least one robotic device being less than a predetermined value. The classified perimeter device may be, for example, a "wall" device where the environmental object is a wall and the distance between the wall and the device is less than the predetermined value.

In yet another embodiment of this aspect of the invention, a movement of a robotic device is away from at least one neighboring child robotic device. The movement of the robotic device may be preconditioned on the robotic device being able to communicate with the at least one neighboring child robotic device. For example, it may be preconditioned on the robotic device being able to communicate with two neighboring child robotic devices. In still another embodiment, the movement of the robotic device is inhibited until a predetermined condition is satisfied. The predetermined condition may be, for example, communication between the robotic device and at least one neighboring child robotic device.

In yet another aspect, the invention features another method for dispersing a plurality of robotic devices. According to this method, a boundary condition is defined. A relative position with respect to at least one closest neighboring robotic device, for example with respect to two closest neighboring robotic devices, is computed for each robotic device, and a dispersal velocity is also computed for each robotic device based at least in part on the computed relative position of that robotic device. Each robotic device is then operated according to its computed dispersal velocity such that each robotic device attempts to be separated from at least two of its closest neighboring robotic devices by a substantially uniform distance not exceeding the boundary condition.

In various embodiments of this aspect of the invention, the boundary condition is based at least in part on a predetermined distance between each robotic device, an environmental object, and/or a count of neighboring robotic devices. The relative position with respect to the at least one closest neighboring robotic device may be computed using relative coordinates, and may be expressed as a bearing with respect to the at least one closest neighboring robotic device and/or as a distance from the at least one closest neighboring robotic device.

In still another aspect, the invention features yet another method for dispersing a plurality of robotic devices. According to this method, the plurality of robotic devices are dispersed in first and second manners. To disperse the plurality of robotic devices in the first manner, at least one robotic device is classified as a front line device based at least in part on relative positions of neighboring robotic devices. The at least one front line device is then moved and a subset of the plurality of robotic devices is moved relative to the movement of the at least one front line device. To disperse the plurality of robotic devices in the second manner, a dispersal velocity is computed, for each robotic device, based at least in part on a relative position of the robotic device with respect to at least one closest neighboring robotic device. Each robotic device is then operated according to its computed dispersal velocity such that each robotic device attempts to be separated from at least two of its closest neighboring robotic devices by a substantially uniform distance.

In one embodiment of this aspect of the invention, dispersing the plurality of robotic devices in the second manner is performed upon determining that the plurality of robotic devices can not be further dispersed in the first manner. The plurality of robotic devices may again be dispersed in the first manner, however, upon determining a change in an environmental parameter that permits the plurality of robotic devices to again be dispersed in the first manner.

Additionally, in another aspect, the invention relates to a method for clustering a plurality of mobile robotic devices. The method includes selecting, for a downstream robotic device, a neighboring upstream robotic device as a reference device, maintaining the selected reference device stationary until a predetermined condition is satisfied, and moving the downstream robotic device relative to the selected reference device.

In one embodiment of this aspect of the invention, each of the plurality of mobile robotic devices includes a unique identifier and the downstream robotic device selects the available neighboring upstream robotic device that has the lowest unique identifier. The method may also include determining whether any neighboring upstream robotic device has previously been selected by another downstream robotic device.

In one particular embodiment, a plurality of downstream robotic devices select one neighboring upstream robotic device as the reference device. In such a case, the predetermined condition is satisfied when the plurality of downstream robotic devices have all moved upstream of the selected reference device. Once the plurality of downstream robotic devices have all moved upstream of the selected reference device, the selected reference device may be moved after selecting, for the selected reference device, a neighboring upstream robotic device as a reference device.

These and other aspects and advantages of the present invention will become apparent from the following detailed description, taken in conjunction with the accompanying drawings; illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 1B is an external view of a robotic device in accordance with an embodiment of the invention;

FIG. 1C is a view showing components of a robotic device in accordance with an embodiment of the invention;

FIG. 1D is a view showing components of a robotic device in accordance with an embodiment of the invention;

DETAILED DESCRIPTION

Figure 1A:
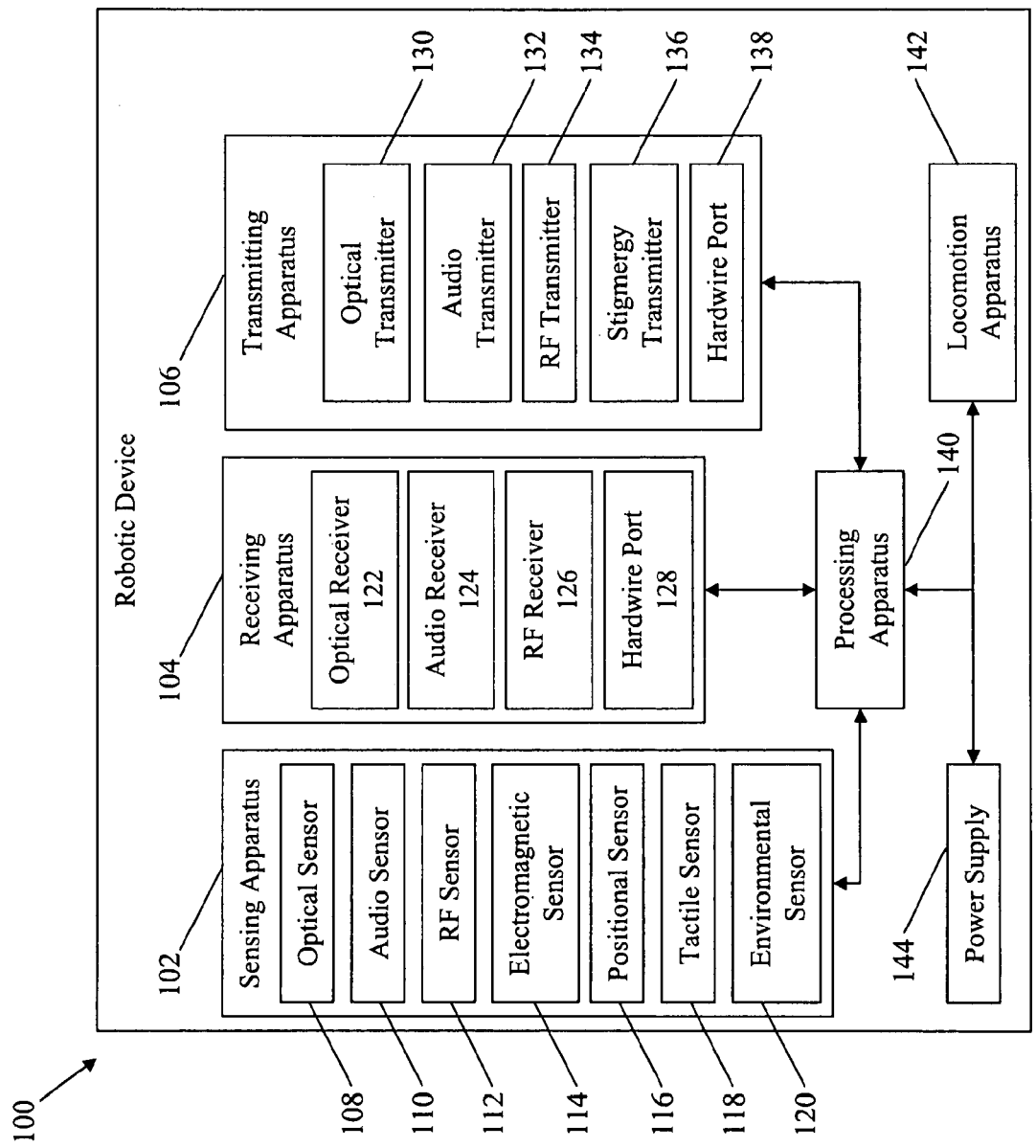
FIG. 1A is a block diagram depicting components of a robotic device in accordance with an embodiment of the invention.

As shown in the drawings for the purposes of illustration, the invention may be embodied in a method for operating robotic devices capable of receiving, processing, and acting on one or more multi-device primitive commands. These commands, in conjunction with data obtained from other robots, allow several robots to interact with each other and adapt their behaviors accordingly. Embodiments of the invention allow the deployment of several robots generally without overtaxing a central command and control apparatus or operator.

In brief overview, FIG. 1A is a block diagram depicting components of a robotic device 100 in accordance with an embodiment of the invention. The robotic device (alternatively, "robot") 100 typically includes subsystems, such as sensing apparatus 102, receiving apparatus 104, and transmitting apparatus 106, for processing signals and data. For example, the sensing apparatus 102 typically includes components that generate data related to the environment surrounding the location occupied by the robot 100. One such component can be an optical sensor 108. In one embodiment, the optical sensor 108 is a simple photodetector for characterizing (e.g., measuring) the ambient light (e.g., visible, infrared, ultraviolet) about the robot 100. On the other hand, the optical sensor 108 can be configured to detect contrast differences in material near the robot 100. In this case the optical sensor 108 would typically include one or more CCD imaging components. This may be enhanced by including a camera (e.g., a CCD camera) that captures video images.

The sensing apparatus 102 can also include an audio sensor 110. A typical audio sensor 110 can be, for example, a microphone for receiving audible signals, thereby giving the robot 100 the ability to "hear." The audio sensor 110 can also be configured to receive audio signals outside the audible range (i.e., subsonic or ultrasonic signals, or both), such as those used with, for example, vibration analysis, distance measurement, and intruder detection. Multiple audio sensors 110 may be employed, thereby allowing the determination of the location of an audio source by, for example, analyzing and comparing the characteristics of the signals received by each.

For detecting radio frequency ("RF") emissions, the sensing apparatus 102 can include an RF sensor 112. Depending on the application and environment, the RF sensor 112 can be configured to receive RF signals across a wide or narrow frequency spectrum. The RF sensor 112 can simply provide an indication of the presence of RF emissions about the robot 100. Alternatively, the RF sensor 112 can include additional signal processing circuitry to demodulate, decode, or otherwise interpret the RF emissions, thereby revealing intelligence in the emissions. The robot 100 can then react on the basis of this "signal intelligence."

The sensing apparatus 102 can also include an electromagnetic sensor 114. This sensor is similar to the RF sensor 112, but it is configured to detect electromagnetic signals that typically fall outside the RF range. For example, the electromagnetic sensor 114 may perceive the presence of a power line or other low frequency signal. The electromagnetic sensor 114 may also include Hall-effect devices that permit the detection of magnetic material. In a related embodiment, the electromagnetic sensor 114 detects the presence of metallic material.

In one embodiment, the robot 100 is a mobile device. Consequently, to collect data on the position and motion of the robot 100, the sensing apparatus 102 can include a positional sensor 116. The positional sensor 116 typically is capable of determining the location of the robot 100, either in absolute terms or relative to a defined point, in one, two, or three dimensions, or relative to another robot. For example, the positional sensor 116 can include a compass and rotary encoders that allow a position to be determined based on dead reckoning. Alternatively, the positional sensor 116 can include the necessary hardware and software to receive and process signals from Global Positional System ("GPS") satellites, thereby providing a high-accuracy determination of position. Optionally, the positional sensor 116 can detect if the robot 100 is no longer level or has toppled.

The positional sensor 116 may also include the capability to determine one or more of speed, velocity, or acceleration of the robot 100. For example, the positional sensor 116 can include one or more rotary encoders for measuring speed. Including a compass and integrating its data with that from the rotary encoders would typically yield a determination of velocity. Alternatively, the positional sensor 116 may include a gyroscope to detect changes in orientation. The positional sensor 116 may also include an accelerometer (e.g., a MEMS accelerometer) to determine the acceleration of the robot 100.

In one embodiment, objects that approach the robot 100 (or, objects that the robot 100 approaches) are first detected by employing the audio sensor 110 in connection with distance measurement, as discussed above. For example, the robot 100 can collect data to show that the robot 100 and the object are nearing each other. At some point the robot 100 and object may contact each other. A tactile sensor 118 generally detects this event. Typically, the tactile sensor 118 is electromechanical in nature, employing switches (e.g., piezoresistive switches) that react to various (and generally configurable) levels of external mechanical contact force. The tactile sensor 118 may be directional or omnidirectional. The switches may also be capacitive, meaning that they react to changes in capacitance when the robot 100 contacts the object. Further, if they are sufficiently sensitive, the capacitive switches can typically detect close proximity of the object to the robot 100 (i.e., without contact). In any case, the tactile sensor 118 is typically disposed about the periphery of the robot 100 in a leading position, so as to contact the object before other parts of the of the robot 100 make contact. In an alternative embodiment, the tactile sensor 118 is used to orient the robot 100 relative to a second robot when the two are sufficiently close such that other communication methods are unavailable.

In a related embodiment, the tactile sensor 118 also senses the angle at which the robot 100 interacts with an object. For example, several (e.g., two) tactile sensors 118 may be disposed on each side of the robot 100. Assuming each tactile sensor 118 detects the object, the time difference between the respective detections is determined. The processing apparatus 140 uses the time differences and the known geometric placement of the tactile sensors 118 and computes an angle at which the robot 100 interacts with an object. (Note that, in some embodiments, the tactile sensors 118 can be optical in nature and detect contact, or proximity, or both, by optical means.)

Typically, the atmospheric conditions at the location of the robot 100 are important in certain applications. Consequently, in one embodiment, the sensing apparatus 102 includes an environmental sensor 120 that reacts to atmospheric conditions. For example, the environmental sensor 120 can include components to determine ambient temperature, pressure, humidity, and the like. In related embodiments, the environmental sensor 120 detects the presence of one or more of radioactive materials, explosive materials, or specific chemical elements. In any case, the environmental sensor 120 can also be configured to determine environmental characteristics of an object about the robot 100 by, for example, the robot 100 placing the environmental sensor 120 in, on, or near the object.

In various embodiments, the sensing apparatus 102 includes one or more amplifiers, and it may incorporate signal processing apparatus, to enhance or modify the signals and data received.

In addition to the sensing apparatus 102, the robot 100 typically includes a receiving apparatus 104. In general, the receiving apparatus 104 is configured to receive signals that include commands and other data from, for example, one or more other robots. These signals may be conveyed from their source (e.g., one or more other robots) to the robot 100 optically, via RF, via audio frequency, or via a physical link. In various embodiments, the receiving apparatus 104 includes one or more amplifiers, and it may incorporate signal processing apparatus, to enhance or modify the command and data signals received.

In one embodiment, an optical receiver 122 is configured to receive signals that are typically sent using infrared light. These signals may be sent via a fiber optic link, or across open air. Although depicted in FIG. 1A as separate from the optical sensor 108, the optical receiver 122 may be integrated with the optical sensor 108. Further, the optical receiver 122 and the optical sensor 108 may be the same component, albeit with the capability to perform the different functions required by each.

The receiving apparatus 104 can also include an audio receiver 124 that receives command and data signals conveyed from their source at one or more audio frequencies. The signals can be either inside or outside of the audible range. For example, the robot 100 can be configured to react to commands given as one or more sounds (e.g., beeps, tones, chirps) uttered by an operator. The audio receiver may also be capable of speech recognition, thereby permitting word- or phrase-based commands that the robot 100 can recognize and act on. The audio receiver 124 may also be configured to react to signals conveyed subsonically, or ultrasonically, or both.

Although depicted in FIG. 1A as separate from the audio sensor 110, the audio receiver 124 may be integrated with the audio sensor 110. Further, the audio receiver 124 and the audio sensor 110 may be the same component, albeit with the capability to perform the different functions required by each.

The receiving apparatus 104 can include an RF receiver 126 that is configured to receive command and data signals that are typically sent using radio frequency. These signals may be sent via a wired link or across open air (i.e., "wirelessly"). In one embodiment, the signals are sent at a frequency of about 916 MHz. The signals are generally digital in nature, and typically have a bit rate from about 19.2 kbps to about 115 kbps, although other speeds are possible.

Although depicted in FIG. 1A as separate from the RF sensor 112, the RF receiver 126 may be integrated with the RF sensor 112. Further, the RF receiver 126 and the RF sensor 112 may be the same component, albeit with the capability to perform the different functions required by each.

In another embodiment, the receiving apparatus 104 includes a hardwire port 128 that allows a direct, wired access to the robot 100. Accordingly, command and data signals may be conveyed through a wire and to the robot 100 through the hardwire port 128. The hardwire port 128 can include one or more of a serial port (e.g., RS-232), a USB port, or a JTAG port.

In addition to the sensing apparatus 102 and the receiving apparatus 104, the robot 100 typically includes a transmitting apparatus 106. In general, the transmitting apparatus 106 is configured to transmit signals that include commands and other data (e.g., data acquired by the sensing apparatus 102) to, for example, one or more other robots. These signals may be conveyed from the robot 100 to their destination (e.g., one or more other robots) optically, via RF, via audio frequency, via stigmergy (discussed below), or via a physical link. In various embodiments, the transmitting apparatus 106 includes one or more amplifiers, and it may incorporate signal processing apparatus, to enhance or modify the signals and data transmitted.

The transmitting apparatus 106 may be considered analogous to the receiving apparatus 104. Accordingly, many components that may be included in the transmitting apparatus 106 can be similar to those included in the receiving apparatus 104. For example, an optical transmitter 130 is configured to transmit command and data signals that are typically sent using infrared light. These signals may be sent via a fiber optic link, or across open air. In other embodiments, the optical transmitter 130 may emit visible light. In different embodiments, the optical transmitter 130 includes one or more of a light emitting diode, or laser, or simple incandescent indicator lights. In one embodiment, the optical receiver 122 on another robot receives the signals sent by the optical transmitter 130 of robot 100.

Similarly, the transmitting apparatus 106 may include an audio transmitter 132 that transmits command and data signals at one or more audio frequencies, either inside or outside of the audible range. In one embodiment the audio transmitter 132 includes one or more speakers. In another embodiment the audio transmitter 132 includes one or more ultrasonic emitters. Other embodiments include one or more of sound synthesizers, speech synthesizers, or MIDI devices. The audio transmitter 132 may also be configured to provide high fidelity audio (e.g., stereo sound).

Continuing the analogy with the receiving apparatus 104, the transmitting apparatus 106 may include an RF transmitter 134 that is configured to transmit command and data signals that are typically sent using radio frequency. These signals may be sent via a wired link or across open air (i.e., "wirelessly"). In one embodiment, the signals are sent at a frequency of about 916 MHz. The signals are generally digital in nature, and typically have a bit rate from about 19.2 kbps to about 115 kbps, although other speeds are possible.

In one embodiment, the transmitting apparatus 106 includes a stigmergy transmitter 136. "Stigmergy" is typically defined as communication through the environment, which allows the coordination of actions between several objects. For example, "Object A" can communicate with "Object B" using stigmergy when Object A marks the environment in a way that Object B can detect. To illustrate, Object A can mark the environment by leaving a chemical trail as Object A moves. Object B can detect this trail and, for example, follow Object A, even if Object B cannot detect Object A. (Detection can also cause Object B to take other actions.) In addition to a chemical-based trail, the trail may include other matter having certain properties (e.g., optical, magnetic, etc.) that Object B can detect. Object A may also leave a trail by exposing at least a portion of the environment to, for example, a high- or low-temperature probe that marks the environment. In any case, the trail may disappear after some fixed time, meaning "stigmeric" communication can have a limited duration as well as provide temporal information as to when Object A was present at a particular location.

Stated in different terms, stigmergy is based on sensing and sampling the environment and responding to it. Note that stigmeric communication may also be achieved if the robot 100 is directed to perform a task that, as a consequence, alters the environment. Thus, by a single action, the robot 100 can (i) complete a task, and (ii) communicate with others.

In one embodiment, the stigmergy transmitter 136 includes a liquid reservoir and dispenser that deposits liquid (typically water) at the location of the robot 100. As the robot 100 moves, the stigmergy transmitter 136 creates a water trail on a nearby surface. If the surface changes its appearance (e.g., contrast, or color, or both) when dampened, the optical sensor 108, or the optical receiver 122, or both, can typically detect this change. Consequently, as robot 100 moves about leaving a water trail, one or more other robots can detect the trail and, for example, follow robot 100. When the water dissipates and the surface dries, communication by stigmergy is generally no longer possible. Nevertheless, in other embodiments, the stigmergy transmitter 136 deposits other material (i.e., other than water, and other than liquids), and time allowed for stigmeric communication can be varied according to material selection. For example, liquids or special surface treatments may be used including those with hydrochromic, photochromic (e.g., ultraviolet) or thermochromic properties.

In another embodiment, the transmitting apparatus 104 includes a hardwire port 138 that allows a direct, wired access to the robot 100. Accordingly, command and data signals may be conveyed through a wire and to the robot 100 through the hardwire port 138. The hardwire port 138 can include one or more of a serial port (e.g., RS-232), a USB port, or a JTAG port. In one embodiment, the hardwire port 138 and the hardwire port 128 included in the receiving apparatus 104 may be implemented as a single port capable of bidirectional transfer of the command and data signals.

In a related embodiment, the output power of the transmitting apparatus 106 may be set to a predetermined level to limit the range of the transmitted signals. For example, a signal transmitted at a reduced power may reach only a limited number of destinations out of all available destinations. Assuming the destinations to be other robots, this results in only a limited number of other robots responding to the transmitted signals, instead of all available other robots. Conversely, a signal transmitted at an increased power may reach most, if not all, available other robots. Consequently, the magnitude of the desired response to the transmitted signals, characterized by the number of responding robots, may be tailored for a particular application.

Although FIG. 1A depicts the receiving apparatus 104 and the transmitting apparatus 106 as separate elements, in one embodiment they are integrated in a single apparatus (e.g., a transceiver). The transceiver configuration exploits the analogous nature of the receiving apparatus 104 and the transmitting apparatus 106, as discussed above.

In one embodiment, the receiving apparatus 104 and the transmitting apparatus 106 includes multiple receivers and transmitters, respectively, arranged about the periphery of the robot 100. These receivers and transmitters typically have an overlapping field of view. For example, four receivers may be spaced at ninety-degree intervals, but each is able to receive signals in a 135-degree arc. Consequently, using differential signal strength received by the various receivers, the robot 100 determines the distance and relative position (i.e., bearing) of another robot. In still other embodiments, not shown, another receiver mounted above or below the plane of the transmitting apparatus 106 allows the calculation of the relative elevations between two robots. By measuring the relative elevation angles of various robots as the robots move through their environment, a contour map of the environment can be created.

In a further embodiment, the robot 100 includes a processing apparatus 140 that is in communication with the sensing apparatus 102, the receiving apparatus 104, and the transmitting apparatus 106 subsystems. The processing apparatus 140 typically includes a microprocessor and associated hardware (e.g., memory, logic included in, for example, gate arrays, etc.) that monitors and controls the operation of these subsystems. In another embodiment, the processing apparatus 140 also communicates with a locomotion apparatus 142. The locomotion apparatus 142 includes drivetrain components, such as wheels, motors, and gearing. The processing apparatus 140 communicates with the locomotion apparatus 142 to move the robot 100 in a desired fashion.

A power supply 144 is included to provide operating power for the robot 100 and its subsystems, including the locomotion apparatus 142. In one embodiment, the power supply 144 includes rechargeable batteries (e.g., based on NiCd, Li-MH, Li-Ion, etc., chemistries) and associated monitoring-charging circuitry. The monitoring-charging circuitry ascertains the capacity of the power supply 144 (i.e., the capacity of the rechargeable batteries). The processing apparatus 140 communicates with the power supply 144 and, based on the data provided by the monitoring-charging circuitry, determines when the capacity falls to a level where recharging is needed. If recharging is needed, the processing apparatus 140 then causes the robot to perform a contingency task that, in one embodiment, results in the robot 100 returning to a charging station where the batteries are recharged.

In a further embodiment, the processing apparatus 140 has complete control of the power supply 144. For example, the receiving apparatus 104 can receive a command to turn-off the robot 100. The processing apparatus 140, in communication with the receiving apparatus 104, processes this command and instructs the power supply 144 to remove power from the robot 100. Of course, portions of the robot 100 remain powered to permit the robot 100 to receive a subsequent "turn-on" command.

FIGS. 1B, 1C, and 1D provide views of a robot in accordance with an embodiment of the invention. FIG. 1B is an external view showing, for example, some embodiments of the optical transmitter 130, the audio transmitter 132, and the stigmergy transmitter 136. Also depicted is a pantograph 146 that is connected to the power supply 144 to connect the latter with the charging station. The circuit formed between the charging station and the power supply 144 via the pantograph 146 permits charging of the batteries of the robot 100.

FIG. 1C provides a view of certain components of one embodiment of the invention. In particular, the tactile sensor 118 (e.g., a "bump skirt") is shown. Also shown are two implementations of the optical receiver 122: an infrared receiver 122A and a camera 122B. Lastly, two optical transmitters 130 are depicted.

FIG. 1D also provides a view of certain components of one embodiment of the invention. Specifically, the RF receiver 126 and RF transmitter 134 included in a 115 kbps digital radio are shown. Also depicted is the optical transmitter 130 configured to operate at about 125 kbps. Hardwire ports 128, 138 are also shown as 230 kbps serial ports.

Figure 2:
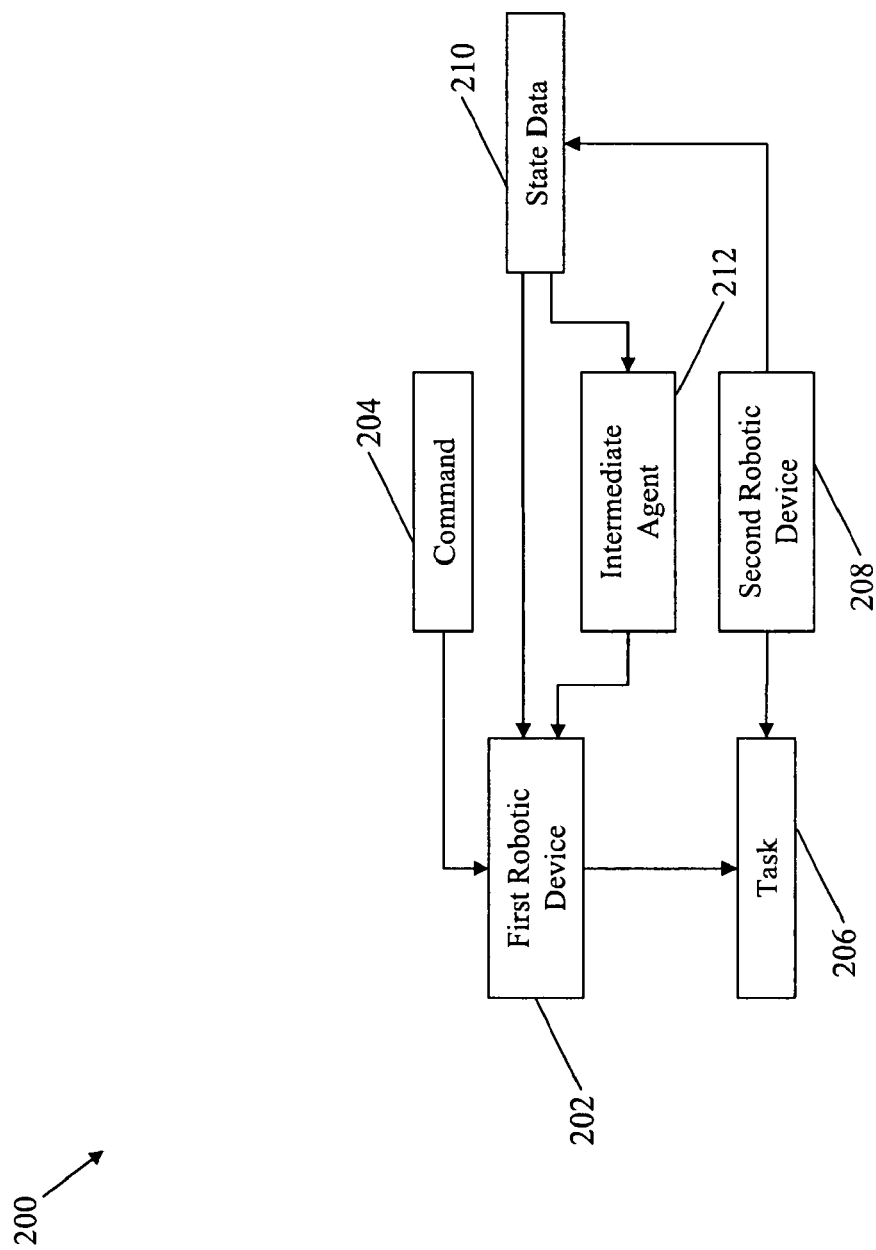
FIG. 2 is a flowchart that depicts a method for operating a robotic device in accordance with an embodiment of the invention.

FIG. 2 depicts a method 200 for operating robotic devices in accordance with an embodiment of the invention. This method includes the steps of defining a first robot 202 and a second robot 208. Next, the first robot 202 receives a multi-device primitive command 204 that influences a task 206 that the first robot 202, or the second robot 208, or both, will perform. Note that the second robot 208 need not be a robot but, in some embodiments, is a fixed transmitter capable, for example, of transmitting state data to the first robot 202.

The multi-device primitive command 204 is an instruction that prescribes the behavior of one robot in relation to the behavior of another robot. This contrasts with a single device primitive command, wherein the behavior of one robot depends on the command and, optionally, an external event, but not necessarily on the behavior of another robot. For example, commands to move a distance, in a direction, or to rotate a certain number of degrees, or to stop motion, are single device primitive commands because the robot receiving them can act on them without regard to another robot. Other example single device primitive commands include those directing a robot to move, rotate, or stop motion until the sensing apparatus 102 detects a particular condition. This condition can include anything discernable by the sensors included in the sensing apparatus 102, as described above. For example, a robot could receive a single device primitive command to move in a direction until it contacts another object, as determined by the tactile sensor 118. Another example single device primitive command includes directing the robot to move, rotate, or stop motion until it senses the presence of a power line (e.g., detected by the electromagnetic sensor 114). A further example includes directing the robot to move, rotate, or stop motion when it determines the absence, presence, or interruption of data received by the sensing apparatus 102, or the receiving apparatus 104, or both.

The multi-device primitive command 204 differs from the single device version at least because the resulting behavior of the robot receiving the former depends in part on one or more other robots. For example, one multi-device primitive command 204 in the orientation primitive category is the "match orientation" primitive. The match orientation primitive instructs a robot to match its orientation with that of at least one other specified robot. (A robot discerns its orientation relative to a reference point typically based on data acquired by the positional sensor 116. The robot can transmit its orientation information to, e.g., other robots, using the transmitting apparatus 106, as discussed above. This transmission is generally in response to its receiving an inquiry as to orientation.)

Referring to the embodiment depicted in FIG. 2, the first robot 202 receives the match orientation primitive that is included in the multi-device primitive command 204. The first robot 202 then determines the orientation of the second robot 208 by, for example, using its transmitting apparatus 106 to transmit an orientation inquiry to the second robot 208. Using its receiving apparatus 104, the first robot 202 receives state data 210 that includes the orientation information. Using its processing apparatus 140, the first robot 202 processes the orientation information, and then performs the task 206 that includes moving to position itself in the identical orientation using the locomotion apparatus 142.

In general, the state data 210 can include one or more of the data acquired by the sensing apparatus 102 of the second robot 208, as discussed above. Consequently, the state data 210 provides a representation of at least part of the area where the second robot 208 is located. For example, this can be a visual representation (e.g., by using the optical sensor 108), an audio representation (e.g., by using the audio sensor 110), an electromagnetic representation (e.g., by using the electromagnetic sensor 114), and a tactile representation (e.g., by using the tactile sensor 118).

The state data can also include information concerning the identity of the second robot 208, its hierarchy (e.g., priority) among several robots, its operational readiness (e.g., in service or out of service), and its configuration (e.g., identity of on-board hardware, version of operating software, task, mission, etc.).

The state data 210 can be conveyed from the second robot 208 to the first robot 202 in several ways. Some embodiments convey the state data 210 optically by using, for example, the optical transmitter 130 in the second robot 208 and the optical receiver 122 in the first robot 202. Other embodiments convey the state data 210 via radio frequency or audio frequency using the corresponding components in the transmitting apparatus 106 of the second robot 208 and the receiving apparatus 104 of the first robot 202. The state data 210 can also be conveyed via a physical link between the robots 202, 208. Physical links can be between, for example, the hardwire ports 128, 138. A physical link can also be established with a fiber optic cable. In a different embodiment, the state data are conveyed via stigmergy.

As discussed above, the output power of the transmitting apparatus 106 may be set to a predetermined level to limit the range of the transmitted signals. Using this feature, certain embodiments similarly limit the range of the transmitted state data 210.

In some embodiments, the first robot 202 receives the state data 210 directly from the second robot 208. This typically occurs when the distance between the robots 202, 208 is within the communication range of their receiving apparatus 104 and transmitting apparatus 106. When optical communication is used, this generally occurs when there is an unobstructed path between the robots 202, 208. Nevertheless, in other embodiments, the first robot 202 receives the state data 210 via one or more intermediate agents 212. The intermediate agent 212 can be, for example, a third robotic device. This third robotic device is typically positioned to be within communication range of both the first robot 202 and the second robot 208 and acts as a repeater, relaying information between the robots 202, 208. In the case of optical communication, there is an unobstructed path between the first robot 202 and the third robot, and between the second robot 208 and the third robot. This allows for the instance where, for example, an obstruction between the robots 202, 208 prevents line-of-sight communication.

In a related embodiment, the intermediate agent 212 is a remote sensor, such as a camera positioned to observe the robots 202, 208. In one version of this embodiment, the camera detects the signals emitted by the optical transmitter 130 of the second robot 208. The remote sensor includes image processing apparatus that interprets these signals. For example, the optical transmitter 130 can include one or more indicator lights having a particular color or illumination pattern (e.g., frequency, intensity, duty cycle, etc.) that represent the state of the second robot 208. The remote sensor observes the indicator lights, interprets the colors, or patterns, or both, and relays the meaning of the signals to the first robot 202.

An alternative embodiment includes an operator performing the function of the remote sensor. The operator (e.g., human) observes the signals (e.g., visible, audible) emitted by the transmitting apparatus 106 of the second robot 208 and interprets their meaning. The operator can then relay the corresponding information to the first robot 202. The operator typically uses one or more transmitting devices that emit signals that the receiving apparatus 104 of the first robot 202 can discern.

Figure 3:
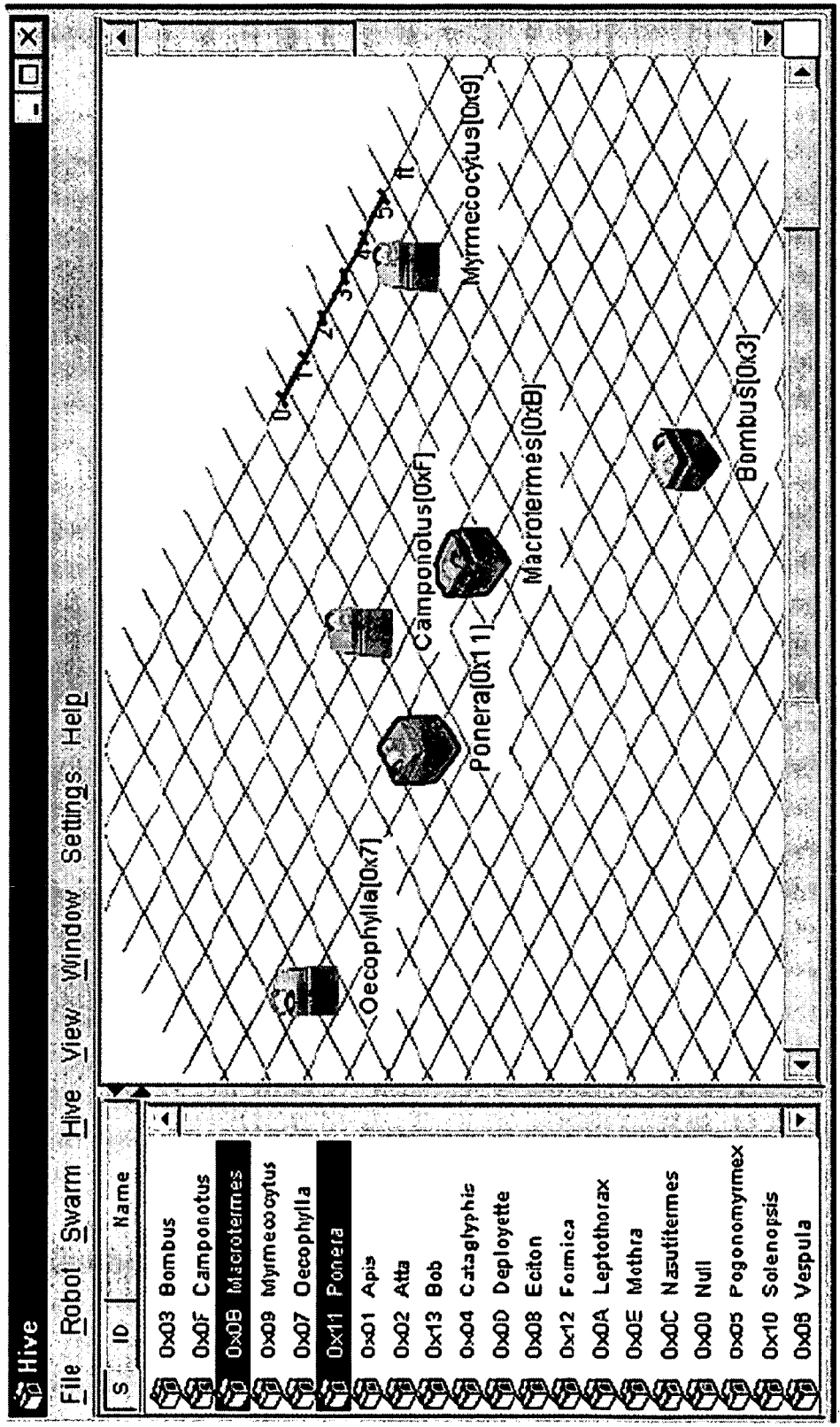
FIG. 3 is an example screen display of a user interface in accordance with an embodiment of the invention.

In a related embodiment shown in FIG. 3, a computer running software provides the operator with a visual representation 300 of the location and status of one or more robots. Icons representing the robots include indicia (e.g., elements representing the optical transmitter 130) that correspond to the state data 210. The operator observes these icons and then communicates with one or more of the robots, typically by using a transmit feature included in the software.

Although the first robot 202 typically receives the state data 210 because the second robot 208 transmits it, such a sequence is not required. In certain embodiments, for example, the first robot 202 receives the state data 210 transmitted by an operator. In this case, the state data 210 may or may not conform to the actual state of the second robot 208.

Another multi-device primitive command 204 in the orientation category is the "orient to robot" command. This command instructs the first robot 202 to position itself relative to the second robot 208 based on, for example, bearing. This differs from the match orientation command because the result of the task 206 need not orient the robots 202, 208 identically.

Yet another multi-device primitive command 204 in the orientation category is the "orient for orbit" command. This command instructs the first robot 202 to position itself such that if it were moving forward, it would tend to orbit the second robot 208. For example, if the distance between the first robot 202 and the second robot 208 is greater than an orbit radius, this behavior will make the first robot 202 head toward the second robot 208. If the distance is less than the orbit radius, then this behavior will point the first robot 202 away from the second robot 208. Any distance about equal to the orbit radius will typically orient the first robot 202 tangentially to the second robot 208.

The multi-device primitive command 204 can also include commands in a bond primitive category. This category includes commands that prescribe, for example, distances between robots that are maintained when the robots are in motion. One such multi-device primitive command 204 is the "maintain distance" command that keeps the first robot 202 a prescribed distance away from the second robot 208. Another command in this category is the "bond with" command that causes the first robot 202 to take a prescribed position and bearing relative to the second robot 208. This is similar to the "orient to robot" command, with the added feature that the position and bearing are maintained as the robots 202, 208 are put in motion.

A further multi-device primitive command 204 is the "follow robot" command where the first robot 202 follows the second robot 208 at a prescribed distance while maintaining an orientation toward the second robot 208. This command is similar to a combination of the "maintain distance" and "orient to robot" commands.

In some embodiments, each robot has an identifier to distinguish it from other robots. It can transmit the identifier to other devices (e.g., other robots), as well as receive and recognize the identifiers of other devices (e.g., other robots). The transmission can include information regarding the identifier or information specifying which transmitter out of several on a particular device transmitted the message, or both. This information can be used to help a robot determine the orientation of its neighbor. For example, the first robot 202 can determine the bearing of and distance to the second robot 208 by engaging multiple receivers and transmitters and examining corresponding differences in signal strengths. Alternatively, and as discussed above, the robots 202, 208 can exchange bearing and distance information, thereby obviating the need to perform signal strength calculations or improve the accuracy of the information through the sharing of information. This typically results in improved orientation information.

In some embodiments, each robot periodically (e.g., asynchronously, using a cycle of four times per second) communicates with the other robots. The corresponding asynchronous signals are organized into packets of data that are continuously received. Robots receiving the incoming data packets typically sort the data into buffers so each robot is able to maintain one or more data structures that include information regarding its current neighbors. In one embodiment, the stored data includes information such as the identifier of the neighbor, the bearing to the neighbor, the distance to the neighbor, the task the neighbor is performing, and the progress of the task toward completion. In a related embodiment, a robot may be removed from a data structure if no data are received from it after a prescribed number of cycles.

In a related embodiment, each robot stores data received in connection with the multi-device primitive command 204. Typical data includes one or more of the identifier of the device (e.g., robot) that originated the command, the identifier of the device (e.g., robot) that relayed the command, or parameters pertaining to one or several multi-device primitive commands 204.

A message transmitted from its source to a destination may experience more than one communication "hop." To illustrate, one robot can receive a signal directly from a transmitting robot or indirectly via, for example, one or more intermediate robots acting as communication repeaters. A "hop count" characterizes the number of receptions and retransmissions that occur from the transmitting robot to the receiving robot via the repeaters. Consequently, the hop count provides a way to determine the separation between the message source and a receiver, corresponding to the distance that the message (e.g., the multi-device primitive command 204) has traveled. One use of the hop count occurs if a robot receives multiple copies of the same multi-device primitive command 204 in the same cycle. In one embodiment, the robot stores information corresponding to that message having the lowest hop count. In other words, the robot stores the multi-device primitive command 204 received most directly from the source.

In some embodiments, the data passed between devices (e.g., robots) includes information requiring retransmission of the data and, optionally, any related multi-device primitive command 204. The information typically includes details identifying the source of the data. The information can also include the hop count as well as a maximum allowable hop count. When, for example, the first robot 202 receives a message requiring retransmission, the first robot 202 increments the hop count and, if it is less than the maximum allowable hop count, retransmits the message to, for example, the second robot 208. The message can also include information that only one or more specifically identified robots receive the data.

In one embodiment, if a device (e.g., robot) receives data requiring retransmission (i.e., message traffic), it typically communicates the presence of this traffic to other devices (e.g., other robots) via the aforementioned asynchronous signals. The data structures based on these signals (described above) generally include information regarding the presence or absence of traffic in neighbor robots. This can be used, for example, to determine the number of robots in a group that include the traffic.

In another embodiment, the traffic includes information to synchronize several robots to a common clock, typically a robot defined as the "temporal leader." In general, this is achieved by sending, via the aforementioned asynchronous signals, data that includes the identifiers of the temporal leader and the transmitting robot, and the times of signal transmission and reception. When a robot receives synchronization information from a neighboring robot, it compares this information with similar data received from other neighboring robots. Only synchronization information having the lowest hop count is generally retained. The synchronization information is typically discarded after the current cycle to prevent the accumulation of stale data.

A robot generally uses the retained synchronization information to adjust its clock to agree with that of the temporal leader, within an allowable error. For example, the robot can add the signal transmission time to its clock, subtract the signal reception time, and set its clock to agree with the mathematical result. Adjusting the clock by applying these offsets will synchronize it with the clock of the temporal leader, subject to, for example, the interrupt latency and lag of the processing apparatus 140. Synchronization errors introduced by these effects can increase with increasing hop count.

In some embodiments, a transmitting robot requires a "handshake" to acknowledge that at least one receiving robot has received the transmission. Alternatively, a robot may transmit a message without requiring a handshake.

A multi-bond primitive category of commands is similar to the bond primitive category. One difference is that the multi-bond primitive category of commands includes commands that influence more than two robots. For example, the "follow leader" multi-device primitive command 204 is a combination of the "follow robot" command and a list of robot identifiers.

When the robots receive the "follow leader" command, the leader (e.g., the first robot 202) is recognized. The other robots (collectively, the second robot 208) identified on the list locate the first robot 202 by using their respective sensing, receiving, and transmitting apparatus 102, 104, 106. The other robots then position themselves behind the first robot 202, typically in the order that they appear in the list. The robots maintain their positions when the first robot 202 is in motion.

Another multi-device primitive command 204 in the multi-bond primitive category is the "distributed follow leader" command. This command is similar to the "follow leader" command, but without the list of robot identifiers. On receipt of this command, the leader robot (e.g., the first robot 202) transmits a signal that causes the second robot 208 to follow. The second robot 208 then transmits a signal that causes another robot to follow it. This process continues until a "chain" of robots reaches a desired length. One advantage of the "distributed follow leader" command is that if a robot in the chain is disabled, the preceding robot can retransmit the signal to "recruit" another robot to follow it. Consequently, a chain of robots configured as described can exhibit a self-healing capability providing autonomous restoration of a damaged chain.

Note that selection of a "leader" robot may be based on one or more criteria. For example, in one embodiment, the robot having the lowest identifier is designated the leader.

The multi-device primitive command 204 can also include commands in a disperse primitive category. This category includes, for example, the "avoid robot" command. When the first robot 202 receives this command, it will perform the task 206 to avoid (e.g., move away from) a prescribed robot (e.g., the second robot 208). The identity of the robot to avoid can be included in the "avoid robot" command. Alternatively, the first robot 202 can determine the identity based on, for example, instructions also included in the command. To illustrate, the first robot 202 may receive the "avoid robot" command that includes instructions to avoid the robot nearest its position. The first robot 202 can use one or more of its sensing, receiving, or transmitting apparatus 102, 104, 106 to locate and identify the nearest robot and then move away accordingly.

A similar command to the "avoid robot" command is the "avoid many robots" command. When the first robot 202 receives this command, it will perform the task 206 to avoid (e.g., move away from) a set of reference robots. Again, the identity of the robots to avoid can be included in the "avoid many robots" command, or the first robot 202 can determine the identity of the robots to avoid. For example, the first robot 202 may be instructed to avoid the n robots nearest its position. The first robot 202 can then use one or more of its sensing, receiving, or transmitting apparatus 102, 104, 106 to locate and identify the n nearest robots and move away accordingly.

The disperse primitive category also includes the "disperse source" multi-device primitive command 204. On receipt of this command, the first robot 202 transmits a signal and, when one or more second robots 208 receive it, they move away from the first robot 202 and any other robot in communication with the first robot 202. In other words, the one or more second robots 208 move away until they no longer receive a signal from the first robot 202 or any other robot in communication with the first robot 202. This typically disrupts the some or the entire inter-robot communication network.

The "disperse source-network" command is similar to the "disperse source" command but avoids disrupting the network. The "disperse source-network" multi-device primitive command 204 limits the dispersion of the second robots 208 from the first robot 202 to the maximum communication range of the receiving apparatus 104 and transmitting apparatus 106, or another prescribed range.

The "disperse equidistant" multi-device primitive command 204 causes each robot in a group of several to determine their distances relative to each other. The global maximum and minimum distances are calculated, and then each robot orients itself (i.e., moves) in an attempt to equalize these distances.

The multi-device primitive command 204 can also include commands in a cluster primitive category. This category includes, for example, the "cluster source" command. When the first robot 202 receives this command, it transmits a signal to other robots (collectively, the second robot 208) that receive it directly or indirectly (e.g., via intermediate robots acting as communication repeaters). A hop count between the first robot 202 and the second robot 208 is determined. On receipt of the signal, each second robot 208 moves to follow those robots having hop counts less than their own. Consequently, the second robots 208 eventually converge on the first robot 202.

A related primitive category is a clumping primitive category. One multi-device primitive command 204 in this category is typically transmitted to a group of robots. Each robot transmits a corresponding signal in a different manner by, for example, including its identifier in the transmission. Other robots receive one or more of these signals. (In general, when a robot receives more than one signal, an algorithm (e.g., based on distance to the transmission source, which may be determined by hop count, or time of arrival) allows it to select one.) Each receiving robot then moves to converge on the robot transmitting the signal and away from other groups. A result is that several clusters of robots form, typically one for each transmitting robot. Note that, similar to as discussed above, the number of robots in each cluster can be determined by examining the data structures of each source robot.

A group orbit primitive category includes an "orbit robot" multi-device primitive command 204. When the first robot 202 receives this command it locates the second robot 208 and performs the task 206 that includes orbiting the latter.

The "orbit group" multi-device primitive command 204 is another command in the group orbit category. When the first robot 202 receives this command it determines the location of several other robots (collectively, the second robot 208). The first robot 202 then performs the task 206 of orbiting the perimeter of these robots.

A topological navigation primitive category includes an "interstitial navigate" multi-device primitive command 204, where the second robot 208 will navigate through several intervening robots to reach the first robot 202. The second robot 208 typically queries each intervening robot to determine the number of communication hops between the intervening robot and the first robot 202. The second robot 208 generally queries each intervening robot it encounters and moves toward those with the lowest hop counts. Using this method the second robot 208 eventually reaches the first robot 202, where there is typically a zero hop count between them. Note that this command allows the second robot 208 to follow a path marked by other robots to reach the first robot 202.

Another multi-device primitive command 204 in the topological navigation primitive category is the "edge detect" command, where several robots determine whether they are on the edge or periphery of the communication network linking them. A robot typically determines the edge by first identifying its neighbor robots and then computing the angle between each pair of neighbors. (This is the angle formed between two line segments: one segment between the robot and the first neighbor, and the second segment between the robot and the second neighbor.) If this angle is greater than about 120 degrees, the robot is deemed to be at an edge.

A surround primitive category includes the "surround object" multi-device primitive command 204. On receiving this command, the first robot 202, on encountering an object and detecting it with the sensing apparatus 102, stops and transmits with the transmission apparatus 106 a request to other robots (collectively, the second robot 208) to orbit. Each of the other robots orbits the first robot 202 until each detects the object and stops. Eventually, a chain of robots forms about the perimeter of the object. The last robot to arrive at and become part of the perimeter typically transmits a message that includes the length of the perimeter and the number of robots.

A shape primitive category includes the "shape formation" multi-device primitive command 204. This command is generally used to prescribe a physical layout of a group of robots. For example, a computer-based description of a desired shape may be entered into the user interface shown in FIG. 3. This may be accomplished by, for example, clicking on and dragging each icon into a desired position that will comprise the shape. A computer program then translates this spatial representation of the shape into computer code that the processing apparatus 140 can handle (e.g., the "C" language) and downloads it into one or more robots. On execution of the corresponding task 206, the robots locate each other and position themselves in a shape corresponding to that prescribed. If a robot becomes disabled (indicated by, for example, the transmission of an out of service message or the lack of response to a query), another robot can substitute (either by command or on its own initiative). Consequently, the arrangement of robots can exhibit a self-healing capability providing autonomous restoration of a damaged shape.

The multi-device primitive commands 204 described above can be conveyed to the first robot 202 by any method that the first robot 202 can detect using its sensing apparatus 102, or receiving apparatus 104, or both. Further, the transmission source of these commands can be a computer running software like that described above regarding FIG. 3, a central transmitter, or another robot, or any combination thereof.

One feature of the multi-device primitive commands 204 is that the commands are generally followed and adhered to even when the subject robots are in motion. In other words, the relationship between the first robot 202 and the second robot 208 that results from the task 206 performed after receipt of the multi-device primitive command 204 is typically preserved when one or both of the robots 202, 208 are moving. If, for example, the first robot 202 is given an orbit group command, and the corresponding group of robots is moving, the first robot 202 will endeavor to orbit the moving group, modifying its path accordingly. This contrasts with, for example, a single device primitive command that would typically permit orbiting of a stationary object, because this type of command generally does not depend on the behavior of another robot.

In general, in another aspect, the present invention relates to systems and methods for dispersing a plurality (or swarm) of robotic devices 100 upon receiving a multi-device primitive command 204 to do so. The plurality of robotic devices 100 may be, for example, initially concentrated in an environment, such as an enclosed space or a partially bounded space. According to one method of the invention, the plurality of robotic devices 100 are then dispersed towards unexplored areas within the environment. More specifically, at least one of the plurality of robotic devices 100 is classified as a front line device and leads the exploration into the unexplored and unoccupied space. A subset of the plurality of robotic devices 100 are then moved relative to the front-line device. In some related embodiments, more than one robotic device 100 is classified as a front line device and the exploration into the unexplored and unoccupied space is led in more than one direction.

According to another method of the invention, the plurality of robotic devices 100 may be uniformly dispersed throughout their environment. For example, to uniformly occupy an enclosed space or a partially bounded space, each one of the plurality of robotic devices 100 may be separated from each of its closest neighboring robotic devices by a substantially uniform distance.

In still another method of the invention, the two aforementioned methods are used together to uniformly occupy an initially unexplored environment. For example, in one embodiment, the plurality of robotic devices 100 are initially dispersed towards unexplored areas within the environment. Once all areas within the environment have been explored (e.g., each front line device has reached a wall, a dead-end in a hallway, etc.), the plurality of robotic devices 100 are then uniformly dispersed throughout the environment, such that each one of the plurality of robotic devices 100 is separated from each of its closest neighboring robotic devices by a substantially uniform distance.

Figure 4:
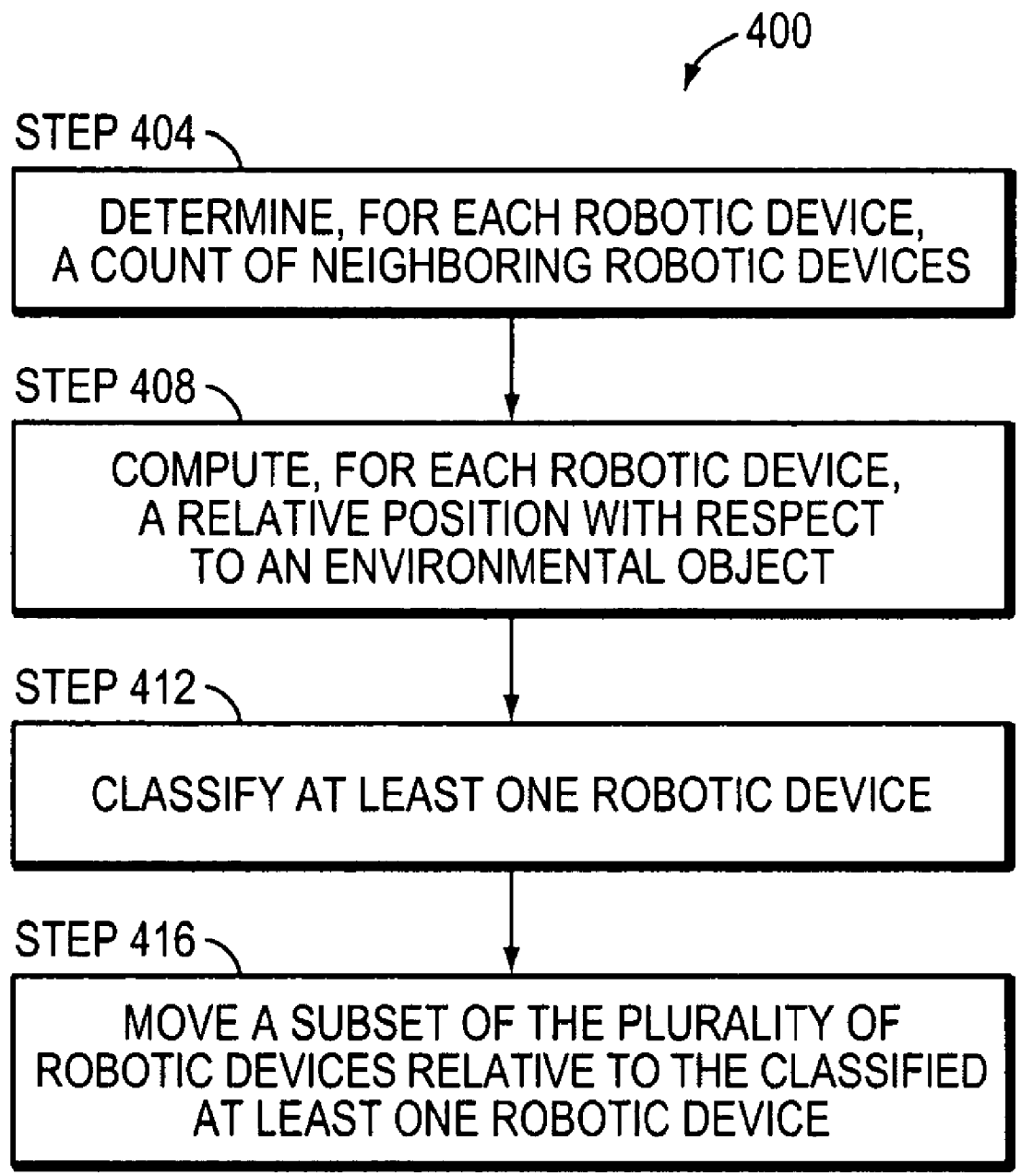
FIG. 4 is a flowchart that depicts a method for dispersing a plurality of robotic devices in accordance with an embodiment of the invention.

Referring to FIG. 4, in one embodiment of a method 400 for dispersing a plurality of robotic devices 100, a count of neighboring robotic devices is determined for each robotic device 100 at step 404, a relative position with respect to an environmental object is computed for each robotic device 100 at step 408, at least one robotic device 100 is classified at step 412, and a subset of the plurality of robotic devices 100 are moved relative to the classified at least one robotic device at step 416. The classification of the at least one robotic device at step 412 may be based, for example, at least in part on its count of neighboring robotic devices and its relative position with respect to the environmental object.

Figure 5:
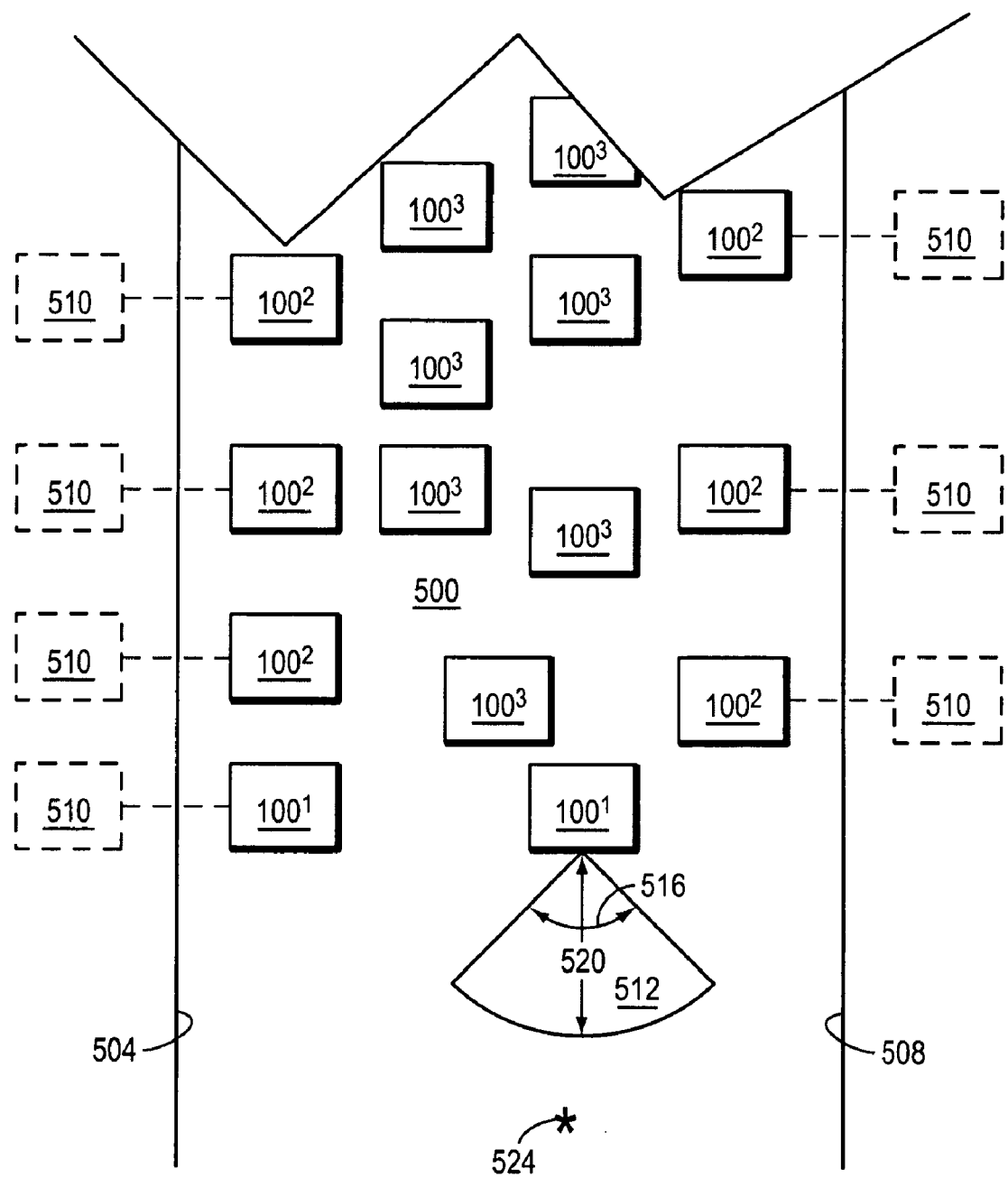
FIG. 5 depicts a plurality of robotic devices in an exemplary environment.

To illustrate the method 400 in greater detail, FIG. 5 depicts a plurality of robotic devices 100 in an environment 500, which includes first and second walls 504, 508. Included within the plurality of robotic devices 100 are two robotic devices classified as front line devices $100^1$, six robotic devices classified as perimeter devices $100^2$, and seven robotic devices classified as interior devices $100^3$. The classification of each of these devices is described in greater detail below.

Referring back to FIG. 4, a count of neighboring robotic devices is determined for each robotic device 100 at step 404. In one embodiment, to establish the count, each robotic device 100 first establishes a list of its neighboring robotic devices. Each robotic device 100 may, for example, as described above, receive identifying signals at its multiple receivers from each of its neighboring robotic devices. In such a case, each robotic device 100 may determine the bearing of and distance to each of its neighboring robotic devices by using a differential signal strength model for the received identifying signals. Alternatively, as also described above, the robotic devices 100 may exchange bearing, distance, and identifying information directly, thereby obviating the need to perform signal strength calculations. The exchanged bearing and distance information may be based on a relative coordinate system, for example relative to an arbitrary origin, may be based on a GPS system and obtained through the use of GPS satellites, or may be otherwise based and obtained. Having identified each of its neighboring robotic devices, each robotic device 100 may then create and maintain a list of its neighboring robotic devices and, for each neighboring robotic device in the list, may also store that neighboring robotic device's bearing relative to it. In one embodiment, the count of neighboring robotic devices for a particular robotic device 100 is then determined from the size of the list (i.e., from the number of entries in the list). In one embodiment, if, at this point, a particular robotic device 100 is found to have no neighboring robotic devices (not shown in FIG. 5), then that robotic device 100 is classified as a singleton device.

At step 408, a relative position with respect to (e.g., a distance to and a bearing of) an environmental object is computed for each robotic device 100. For example, with reference to FIG. 5, relative positions with respect to each of the walls 504, 508 may be computed for each robotic device 100. If, for a particular robotic device 100, the distance to the environmental object is less than a predetermined value, the environmental object (e.g., one of the walls 504, 508 in FIG. 5) may be treated as a neighboring robotic device, as illustrated by the phantom devices 510 in FIG. 5. In such a case, an identifier for the environmental object and its bearing relative to the robotic device in question may be added to the aforementioned list of neighboring robotic devices, and the count of neighboring robotic devices incremented. By adding the environmental object to the list of neighboring robotic devices, the environmental object is considered to be a neighboring robotic device during the classification step 412 described below.

Following steps 404 and 408, at least one robotic device 100 is classified at step 412. In one embodiment, the classification is based at least in part on the at least one robotic device's count of neighboring robotic devices and its relative position with respect to the environmental object. For example, in one embodiment, a robotic device 100 is classified as a front line device when it has at least one neighboring robotic device (i.e., when the count of its neighboring robotic devices is at least one, or at least two when an environmental object has been treated as a neighboring robotic device), but none of those neighboring robotic devices and no environmental objects are within a specified region relative to that robotic device 100. To illustrate, a robotic device 100 is classified as a front line device $101^1$ in FIG. 5 if it has at least one neighboring robotic device, but none of those neighboring robotic devices and no environmental objects (e.g., walls 504, 508) are within a specified region 512 relative to the front line robotic device $101^1$.

In practice, a robotic device 100 may determine that no neighboring robotic devices and that no environmental objects are within a specified region 512, and that it should therefore be classified as a front line device $101^1$, by analyzing the aforementioned list of neighboring robotic devices that it created at step 404. For example, in one embodiment, a robotic device 100 creates a sorted list of the bearings for its neighboring robotic devices (each bearing being stored as an angle relative to a fixed direction). The robotic device 100 then determines the maximum angle between any two adjacent bearings A and B in that sorted list. If the determined maximum angle is greater than or equal to a predetermined angle, for example the angle 516 illustrated in FIG. 5, the robotic device 100 is properly classified as a front line device $101^1$, because there are no neighboring robotic devices and no environmental objects within the region specified by the angle between the two adjacent bearings A and B. If, however, the determined maximum angle is less than the predetermined angle and the distance between the environmental object, for example the wall 504 or 508 in FIG. 5, and the robotic device 100 is less than a predetermined value, the robotic device 100 is classified as a perimeter device 100$^2$, as illustrated in FIG. 5. Otherwise, if the determined maximum angle is less than the predetermined angle and the distance between the environmental object, for example the wall 504 or 508 in FIG. 5, and the robotic device 100 is greater than the predetermined value, the robotic device 100 is classified as an interior device 100$^3$, as also illustrated in FIG. 5.

Because, at step 408, an environmental object was only treated as a neighboring robotic device, and thus only added to the list of neighboring robotic devices, if the distance between the environmental object and the robotic device in question was less than a predetermined value, a robotic device 100 may still be classified as a front line device 100$^1$ if the environmental object is within the maximum angle formed between the two adjacent bearings A and B, but located at a distance greater than the predetermined value from the robotic device 100. For example, if the predetermined value is represented in FIG. 5 by a length 520, an environmental object may be located at position 524 in FIG. 5 (i.e., within the angle 516) and the robotic device still properly classified as a front line robotic device 100$^1$.

Figure 6:
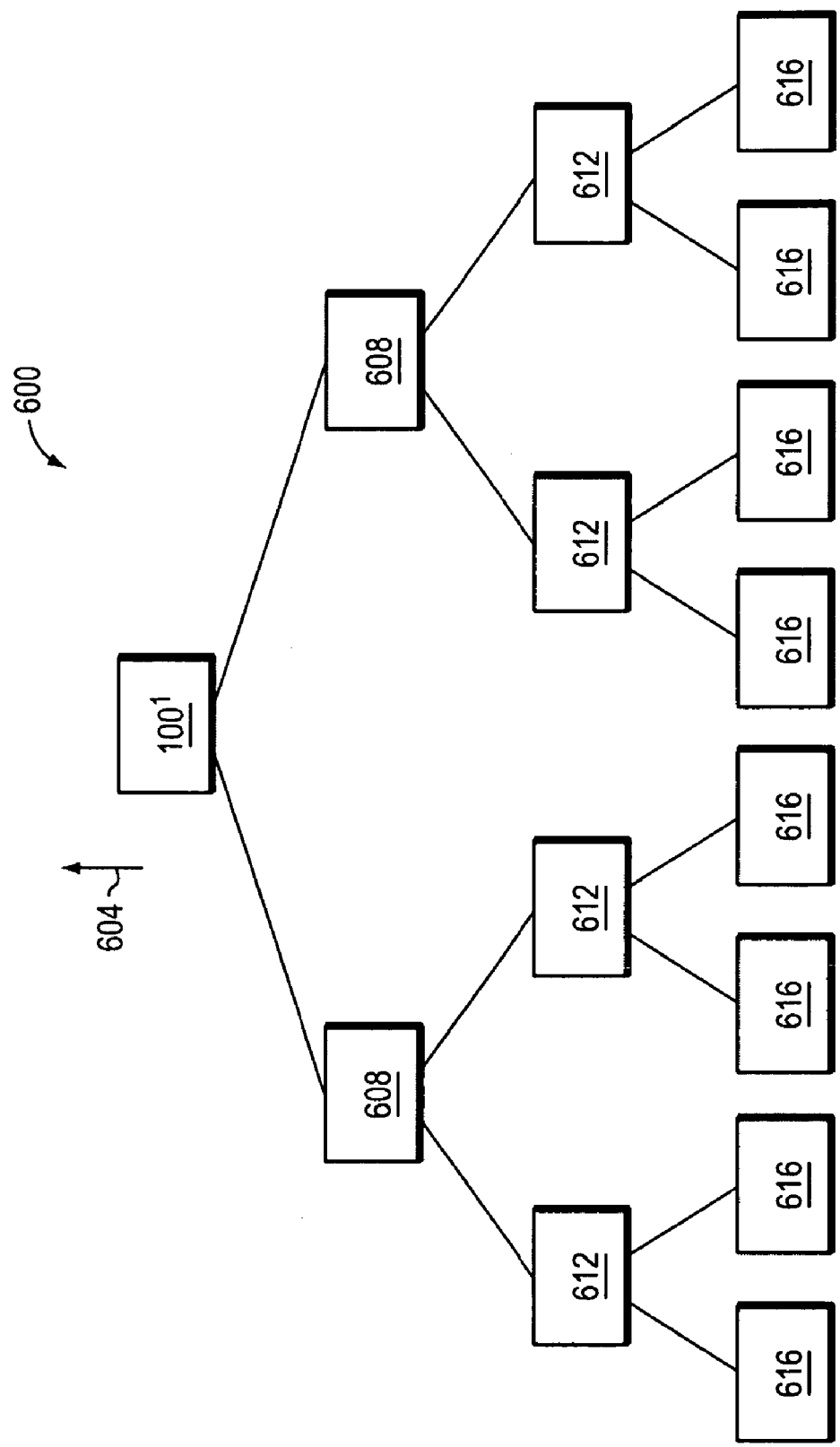
FIG. 6 depicts an exemplary tree of robotic devices.

Once a robotic device 100 has been classified as a front line device 100$^1$ at step 412, a subset of the plurality of robotic devices 100 may be moved, at step 416, relative to the front line device 100$^1$. In one embodiment, the plurality of robotic devices 100 form a tree 600, for example as illustrated in FIG. 6. At the head of the tree 600 and moving in a direction 604 is the front line device 100$^1$. To further movement, the front line device 100$^1$ originates a communication message that is received by its child robotic devices 608, which are one "hop count," as described above, away from the front line device 100$^1$. Each one of the robotic devices 608 in turn transmits the communication message to its child robotic devices 612, which are two hop counts away from the front line device 100$^1$. The communication message continues to be transmitted to each robotic device's child robotic devices in such a fashion until the message reaches the leaf robotic devices 616.

In one embodiment, each robotic device in the tree 600 knows how many hop counts it is away from the source of the communication message (i.e., the front line device 100$^1$) and it knows how many hop counts its neighbors are away from the source of the communication message, which may be one more, the same, or one less. In such an embodiment, each robotic device in the tree 600 moves away from its neighbors that are one more hop count away from the source of the communication message than it is. In other words, each robotic device in the tree 600 moves away from its at least one neighboring child robotic device. Put still another way, the movement of any given robotic device in the tree 600 is preconditioned on the robotic device being able to communicate with at least one, for example two, neighboring child robotic devices. Accordingly, the leaf robotic devices 616, because they are not in communication with any child robotic device, remain stationary and do not move towards the other robotic devices in the tree 600.

In another embodiment, should a robotic device in the tree 600 lose communication with all of its neighboring child robotic devices, the movement of that robotic device is inhibited until a predetermined condition, for example communication between that robotic device and at least one neighboring child robotic device, is satisfied.

In such a fashion, the front line device 100$^1$ leads the other robotic devices in the tree 600, except the leaf robotic devices 616 which remain stationary, towards unexplored and unoccupied space in the direction of arrow 604. Accordingly, the plurality of robotic devices in the tree 600 are dispersed.

Figure 7:
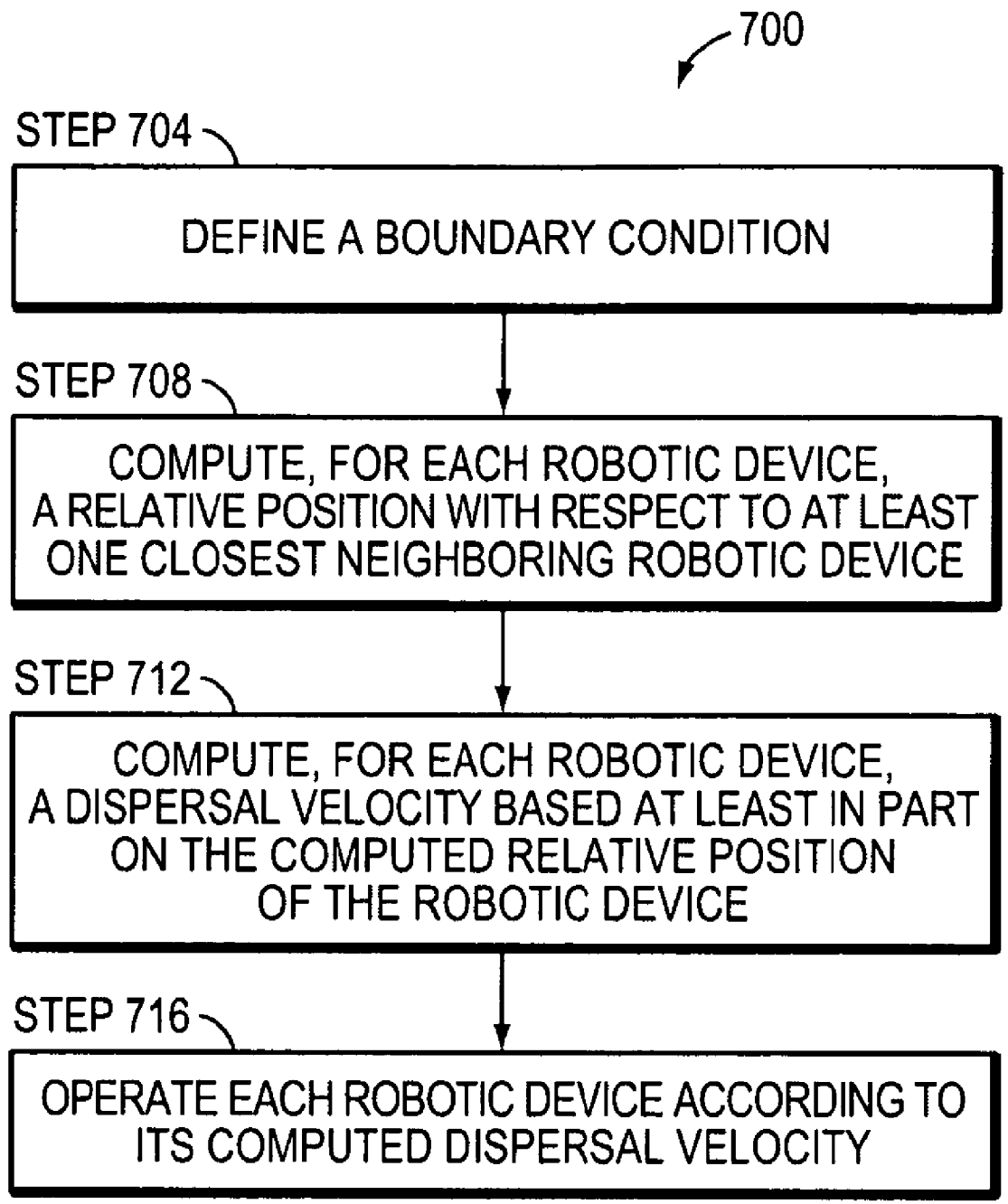
FIG. 7 is a flowchart that depicts a method for dispersing a plurality of robotic devices in accordance with another embodiment of the invention.

Referring to FIG. 7, in another embodiment of a method 700 for dispersing a plurality of robotic devices 100, a boundary condition is defined at step 704, a relative position with respect to at least one closest neighboring robotic device is computed for each robotic device 100 at step 708, a dispersal velocity based at least in part on the computed relative position of the robotic device is computed for each robotic device 100 at step 712, and each robotic device 100 is operated, at step 716, according to its computed dispersal velocity. The computed dispersal velocity is chosen such that, in operation, each robotic device 100 attempts to be separated from at least two of its closest neighboring robotic devices by a substantially uniform distance not exceeding the boundary condition.

In greater detail, at step 704, the boundary condition is defined. In one embodiment, the boundary condition is based at least in part on a predetermined distance between each robotic device 100. For example, the boundary condition may be that no robotic device 100 is to be displaced from its closest neighboring robotic device by more than a predetermined value. In another embodiment, the boundary condition is based at least in part on an environmental object. For example, the boundary condition may be that each robotic device 100 is to stay a predetermined distance away from an environmental object, such as a surrounding wall. In yet another embodiment, the boundary condition is based at least in part on a count of neighboring robotic devices. For example, the boundary condition may be that each robotic device is to maintain communication, for example line-of-sight communication, with at least a certain number of neighboring robotic devices. In still other embodiments, the boundary condition is based on a combination of two or more of these or other factors.

Following the definition of the boundary condition, a relative position with respect to at least one closest neighboring robotic device, for example with respect to two closest neighboring robotic devices, is computed for each robotic device 100 at step 708. In one embodiment, step 708 includes computing, for each robotic device 100, a bearing with respect to its at least one closest neighboring robotic device. In another embodiment, step 708 includes computing, for each robotic device 100, a distance from its at least one closest neighboring robotic device. In still another embodiment, step 708 includes computing, for each robotic device 100, both a bearing with respect to its at least one closest neighboring robotic device and a distance from its at least one closest neighboring robotic device. As described before, the relative position with respect to the at least one closest neighboring robotic device may be computed by using a differential signal strength model for signals received from the at least one closest neighboring robotic device. Alternatively, as also described before, the robotic devices 100 may exchange bearing and/or distance information, thereby obviating the need to perform signal strength calculations. In one embodiment, the relative position information exchanged between the robotic devices 100 is based on a relative coordinate system, for example a coordinate systems that is relative to an arbitrary origin, and the relative position with respect to the at least one closest neighboring robotic device is therefore computed using relative coordinates. In another embodiment, the relative position information exchanged between the robotic devices 100 is based on a GPS system and is obtained from GPS satellites. In this latter case, the relative position with respect to the at least one closest neighboring robotic device is computed using global coordinates.

Following step 708, a dispersal velocity for each robotic device 100 is computed at step 712. The dispersal velocity is based at least in part on the relative position(s), computed at step 708, of the robotic device 100 in question. For example, in one embodiment, the dispersal velocity is based on both the robotic device's bearing with respect to, and its distance from, the at least one closest neighboring robotic device. In one such embodiment, the dispersal velocity of the given robotic device 100 includes both a rotational velocity for the robotic device 100, $v_{rot}$, and a translational velocity for the robotic device 100, $v_{tras}$. In one particular embodiment, these rotational and translational velocities are computed as follows:

$$v_{rot} = -\frac{v_{max}}{c \cdot r_{safe}} \cdot \sum_{i=1}^{c} \cos(nbr_i bearing)(r_{safe} - nbr_i range)$$

$$v_{tras} = -\frac{v_{max}}{c \cdot r_{safe}} \cdot \sum_{i=1}^{c} \sin(nbr_i bearing)(r_{safe} - nbr_i range)$$

where, $v_{max}$ is the maximum velocity output, c is the number of closest neighboring robotic devices for the robotic device in question, $r_{safe}$ is the maximum dispersion distance between any two robotic devices, $nbr_i bearing$ is the bearing of the robotic device in question to its neighbor i, and $nbr_i range$ is the distance of the robotic device in question from its neighbor i.

Following the computation of the dispersal velocity of each robotic device 100 at step 712, each robotic device 100 is operated, at step 716, according to its computed dispersal velocity. For example, in one particular embodiment, each robotic device 100 employs its locomotion apparatus 142 to rotate itself at the velocity $v_{rot}$ and to move itself forwards or backwards at the velocity $v_{tras}$. In accordance with the method 700, the dispersal velocity of each robotic device 100 is computed at step 712 such that, in operation at step 716, each robotic device 100 attempts to be separated from at least two of its closest neighboring robotic devices by a substantially uniform distance not exceeding the boundary condition. The plurality of robotic devices 100 are thereby dispersed in accordance with the method 700.

Figure 8:
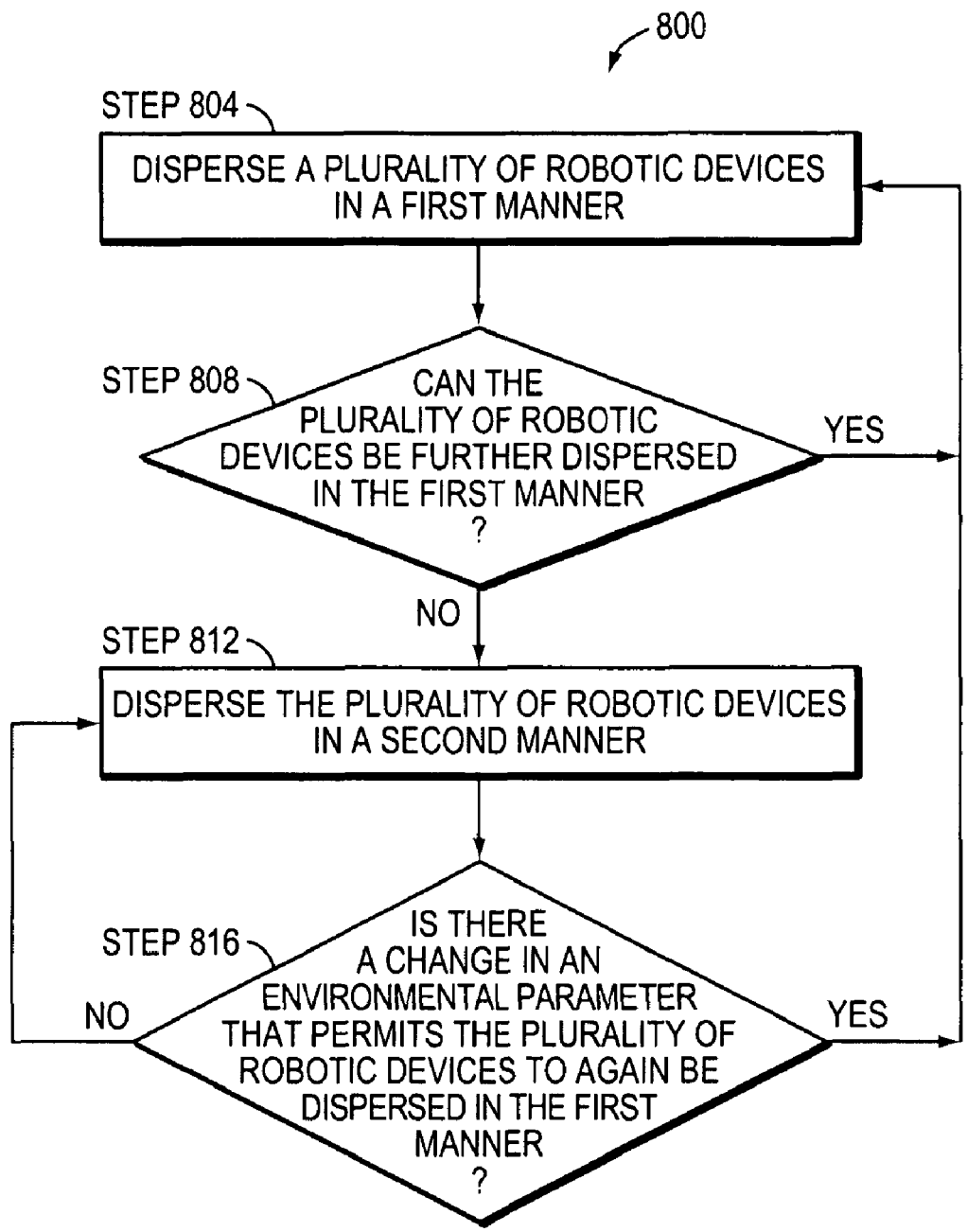
FIG. 8 is a flowchart that depicts a method for dispersing a plurality of robotic devices in accordance with yet another embodiment of the invention.

Referring to FIG. 8, in another embodiment of a method 800 for dispersing a plurality of robotic devices 100, the plurality of robotic devices 100 are dispersed in a first manner at step 804 and are dispersed in a second manner at step 812. Optionally, the plurality of robotic devices 100 are continually dispersed in the first manner until it is determined, at step 808, that the plurality of robotic devices 100 can not be further dispersed in the first manner. Upon making such a determination at step 808, the plurality of robotic devices are then dispersed in the second manner at step 812. Optionally again, the plurality of robotic devices 100 are then continually dispersed in the second manner until it is determined, at step 816, that there is a change in an environmental parameter that permits the plurality of robotic devices 100 to again be dispersed in the first manner. Upon making such a determination at step 816, the plurality of robotic devices 100 are again dispersed in the first manner at step 804.

In one embodiment, the plurality of robotic devices 100 are dispersed in the first manner at step 804 by performing an embodiment of the method 600 described above. In greater detail, at least one robotic device 100 is classified as a front line device $100^1$ based at least in part on the relative positions of its neighboring robotic devices, the one or more front line devices $100^1$ are then moved towards unexplored areas (e.g., open space), and a subset of the plurality of robotic devices 100 are then moved relative to the movement of the at least one front line device $100^1$. The plurality of robotic devices 100 may be dispersed in this first manner until, for example, each front line devices $100^1$ reaches a boundary, a wall, or a dead end, meaning that there is no more open space and that all areas in the robotic devices' environment have been explored.

In one embodiment, once this condition is reached, the plurality of robotic devices 100 can no longer be dispersed in the first manner and are instead dispersed in the second manner at step 812 by performing an embodiment of the method 700 described above. In greater detail, a dispersal velocity is first computed for each robotic device 100 based at least in part on a relative position of that robotic device 100 with respect to at least one of its closest neighboring robotic devices, and each robotic device 100 is then operated according to its computed dispersal velocity, such that each robotic device 100 attempts to be separated from at least two of its closest neighboring robotic devices by a substantially uniform distance.

In one embodiment, the plurality of robotic devices 100 are dispersed in this second manner until, for example, there is a change in an environmental parameter, such as a door being opened, or a boundary, a wall, or a dead end being removed. These changes in the environment lead to more open space and to unexplored areas for the plurality of robotic devices and permits them to again be dispersed in the first manner at step 804. Accordingly, the method 800, as described above, repeats itself and, as is understood by one of ordinary skill in the art, may continue to repeat itself indefinitely.

In general, in another aspect, the present invention relates to systems and methods for clustering a plurality of robotic devices 100 upon receiving a multi-device primitive command 204 to do so. The plurality of robotic devices 100 may be, for example, dispersed in a complex environment with many turns and constrictions. In many such cases, it may be desirable to cluster the plurality of robotic devices 100 in a particular location. For example, it may be desirable to return the plurality of robotic devices 100 to an original point from which they were earlier dispersed, or to move the plurality of robotic devices 100 to another arbitrary location. Where, however, the movement of a robotic device 100 in the plurality is dependent upon line of sight communication with another robotic device 100 in the plurality, as is often the case in a collaborative robotic environment, it can be important to ensure that each robotic device 100 remains connected to another, particularly when navigating sharp corners and turns.

The present invention addresses this need by continuously connecting each downstream robotic device in the plurality to a reference upstream robotic device, which, by definition, is closer to the chosen destination for the robotic devices 100 than the downstream robotic device. In particular, in accordance with this aspect of the invention, each downstream robotic device in the plurality selects an upstream robotic device as a reference device. The relationship between the selected upstream robotic device and the downstream robotic device may be, for example, that of parent robotic device and child robotic device, as described above with reference for example to FIG. 6. The reference device is then maintained stationary until each downstream robotic device that has selected it as a reference moves upstream of the reference device, and thus closer to the chosen destination. Only then may the reference device, which will have itself selected its own upstream reference device, also move towards the chosen destination. As each robotic device moves upstream of its selected reference device, it chooses a new upstream robotic device as a reference device and requests that it remain stationary. In such a fashion, each downstream robotic device in the plurality of robotic devices is continuously connected to an upstream reference device. Accordingly, the plurality of robotic devices are efficiently moved towards their chosen destination, and each robotic device maintains contact with another robotic device, even in the face of sharp turns and corners.

Figure 9:
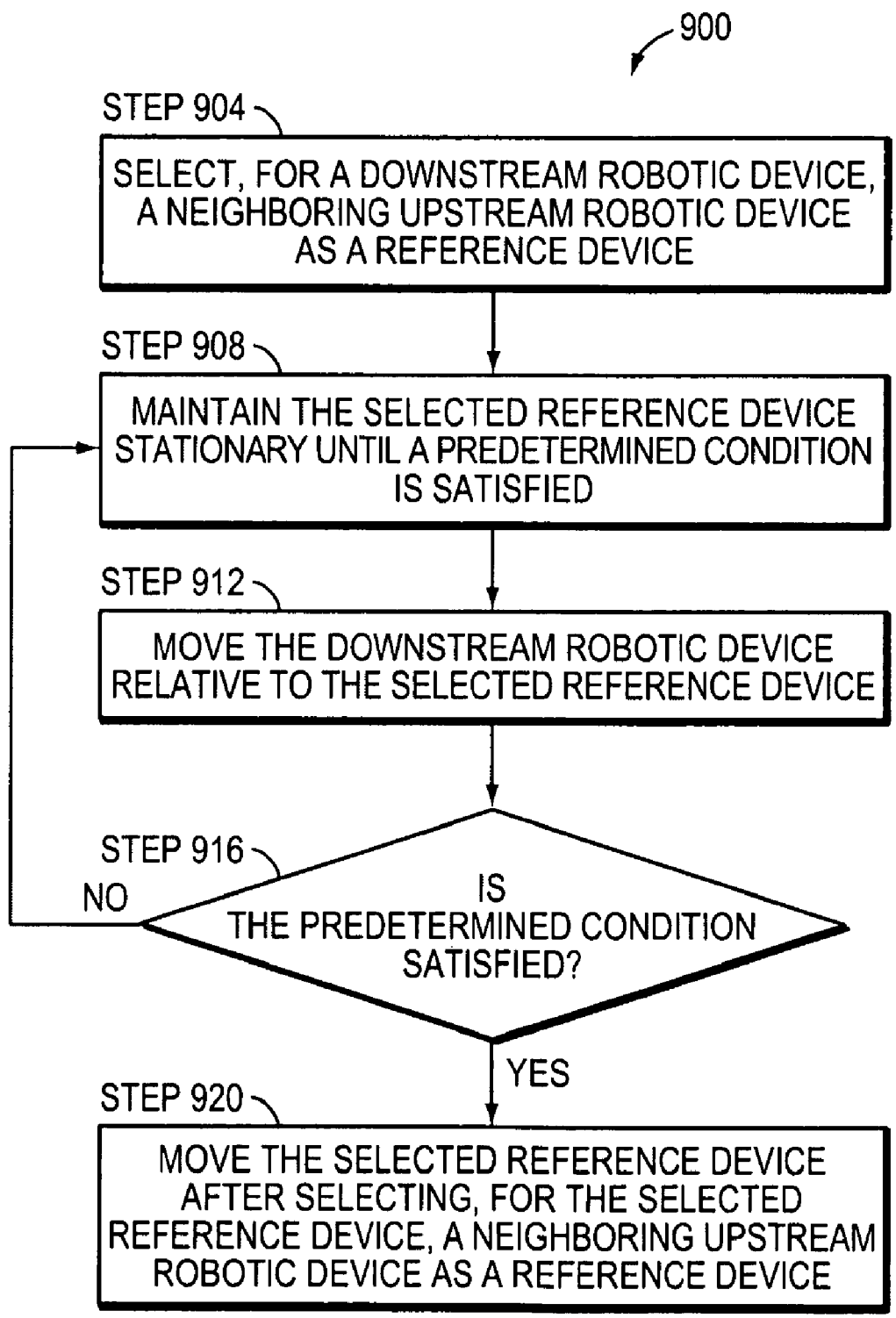
FIG. 9 is a flowchart that depicts a method for clustering a plurality of robotic devices in accordance with an embodiment of the invention.

Referring to FIG. 9, in one embodiment of a method 900 for clustering a plurality of mobile robotic devices 100, a downstream robotic device selects a neighboring upstream robotic device as a reference device at step 904. The selected reference device is then maintained stationary at step 908 until a predetermined condition is satisfied at step 916. The downstream robotic device is moved relative to the selected reference device at step 912. Optionally, upon satisfaction of the predetermined condition at step 916, the selected reference device is moved at step 920 after selecting, for the selected reference device, a neighboring upstream robotic device as a reference device.

Figure 10:
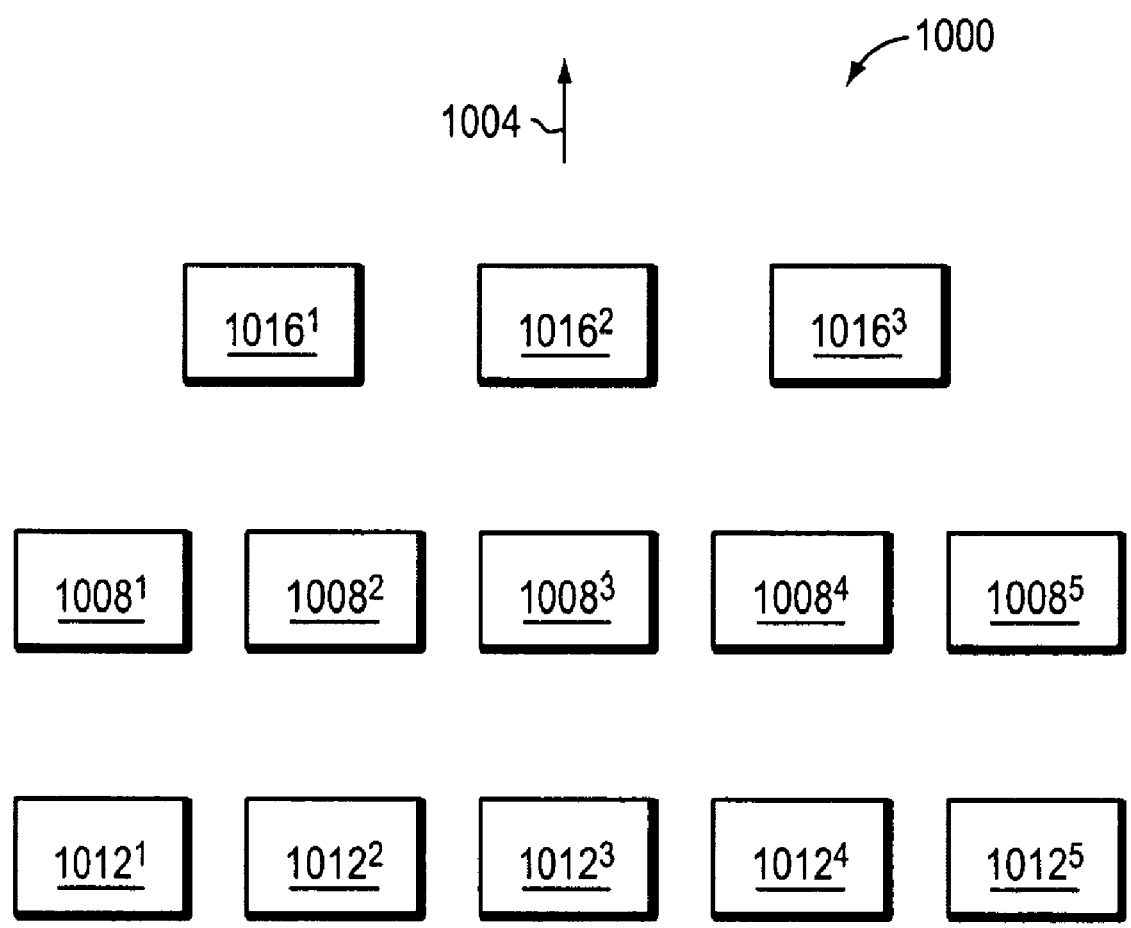
FIG. 10 depicts an exemplary portion of many robotic devices that are clustering towards a chosen destination.

To illustrate the method 900 in greater detail, FIG. 10 depicts a plurality of robotic devices moving (or clustering) towards their chosen destination in the direction of arrow 1004. For ease of illustration, only a portion 1000 of all robotic devices clustering towards the chosen destination in the direction of arrow 1004 is shown. By definition, upstream robotic devices 1008 are located closer to the chosen destination than downstream robotic devices 1012. In one embodiment, each one of the plurality of robotic devices in the portion 1000 includes a unique identifier. As explained below, uniquely identifying each robotic device typically speeds the process by which the robotic devices cluster towards their chosen destination.

Referring now to both FIGS. 9 and 10, a downstream robotic device, for example downstream robotic device $1012^2$, selects a neighboring upstream robotic device as a reference device at step 904. In one embodiment, to speed the process by which the robotic devices cluster towards their chosen destination, each one of the downstream robotic devices 1012 attempts to select the same upstream robotic device 1008 as its reference device. To do so, downstream robotic device $1012^2$ first determines whether any neighboring upstream robotic device 1008 has previously been selected by another downstream robotic device 1012 as its reference device. To illustrate, the set of upstream neighbors for downstream robotic device $1012^2$ may be upstream robotic devices $1008^1$, $1008^2$, and $1008^3$, with upstream robotic devices $1008^4$ and $1008^5$ being, for example, out of sight (e.g., around a corner) or out of the communication range for downstream robotic device $1012^2$ and thus not in the set of its upstream neighbors. Having determined its set of upstream neighbors $1008^1$, $1008^2$, and $1008^3$, downstream robotic device $1012^2$ then determines whether any of those upstream neighbors $1008^1$, $1008^2$, and $1008^3$ have previously been selected by another downstream robotic device $1012^1$, $1012^3$, $1012^4$, and/or $1012^5$ as its reference device. It may be the case, for example, that both upstream neighbor $1008^1$ and upstream neighbor $1008^3$ have previously been selected as a reference device. In such a case, upstream neighbors $1008^1$ and $1008^3$ represent the available neighboring upstream robotic devices from which the downstream robotic device $1012^2$ may select its reference device. In one embodiment, the downstream robotic device $1012^2$ selects, by default, the available neighboring upstream robotic device $1008^1$ or $1008^3$ having the lowest unique identifier as its reference device.

Alternatively, it may be the case, for example, that none of the robotic devices $1008^1$, $1008^2$, or $1008^3$ in the set of neighboring upstream robotic devices for the downstream robotic device $1012^2$ have previously been selected as a reference device. In such a case, all of the neighboring upstream robotic devices $1008^1$, $1008^2$, and $1008^3$ represent the available neighboring upstream robotic devices from which the downstream robotic device $1012^2$ may select its reference device. Again, in one embodiment, the downstream robotic device $1012^2$ selects, by default, the available neighboring upstream robotic device $1008^1$, $1008^2$, or $1008^3$ having the lowest unique identifier as its reference device.

Advantageously, if each downstream robotic device 1012 defaults to selecting, from its available neighboring upstream robotic devices, the robotic device having the lowest unique identifier, the likelihood that more than one of the downstream robotic devices selects the same upstream robotic device as its reference device increases. In total, therefore, fewer upstream robotic devices should be selected as reference devices and maintained stationary as described below at step 908. Consequently, with fewer upstream robotic devices remaining stationary, the speed with which the robotic devices cluster towards their chosen destination increases.

Of course, if a downstream robotic device 1012 has only one available neighboring upstream robotic device 1008 from which to choose a reference device, either because it is the downstream robotic device's only neighboring upstream robotic device or because it is the downstream robotic device's only neighboring upstream robotic device that has been previously selected as a reference device by another downstream robotic device, the downstream robotic device 1012 will choose that available neighboring upstream robotic device 1008 as its reference device.

In one embodiment, each other downstream robotic device $1012^1$, $1012^3$, $1012^4$, and $1012^5$ selects a reference device as just described for downstream robotic device $1012^2$. In addition, each upstream robotic device $1008^1$, $1008^2$, $1008^3$, $1008^4$, and $1008^5$, which is itself downstream from upstream robotic devices $1016^1$, $1016^2$, and $1016^3$, selects an upstream robotic device 1016 as a reference device, and so on.

At step 908 of the method 900, the reference device selected by the downstream robotic device $1012^2$, for example upstream robotic device $1008^3$, is maintained stationary until a predetermined condition is satisfied. The downstream robotic device $1012^2$ is then moved, at step 912, relative to the selected reference device $1008^3$. Similarly, all other downstream robotic devices 1012 that have selected upstream robotic device $1008^3$ as their reference device are moved, at step 912, relative to the selected reference device $1008^3$. Typically, those downstream robotic devices 1012 are moved towards and past the selected upstream robotic device $1008^3$ and thus towards the chosen destination.

At step 916 of the method 900, it is determined whether the predetermined condition is satisfied. If so, the selected reference device is free to move at step 920. If not, the selected reference device must remain stationary until the predetermined condition is satisfied. In one embodiment, as described above, a plurality of downstream robotic devices, such as $1012^2$, $1012^3$, and $1012^4$ all select one neighboring upstream robotic device, such as $1008^3$, as their reference device. In such a situation, the predetermined condition is satisfied when the plurality of downstream robotic devices $1012^2$, $1012^3$, and $1012^4$ have all moved upstream of the selected reference device $1008^3$. In this case, the selected reference device $1008^3$ no longer has any downstream robotic devices for which it is acting as a reference device. In fact, having moved upstream of the selected reference device $1008^3$, each downstream robotic devices $1012^2$, $1012^3$, and $1012^4$ will, as described above, choose a new upstream robotic device as a reference device and again iterate through the steps of the method 900.

At step 920, once the predetermined condition is satisfied, the selected reference device $1008^3$ is free to move. Typically, the selected reference device $1008^3$ will have already selected its own neighboring upstream robotic device as a reference device. Accordingly, the selected reference device $1008^3$ moves relative to its own selected reference device, as previously described (e.g., towards its own selected reference device and therefore towards the chosen destination). In such a fashion, connectivity is maintained between the plurality of robotic devices as they are clustered towards their chosen destination.

Figure 11:
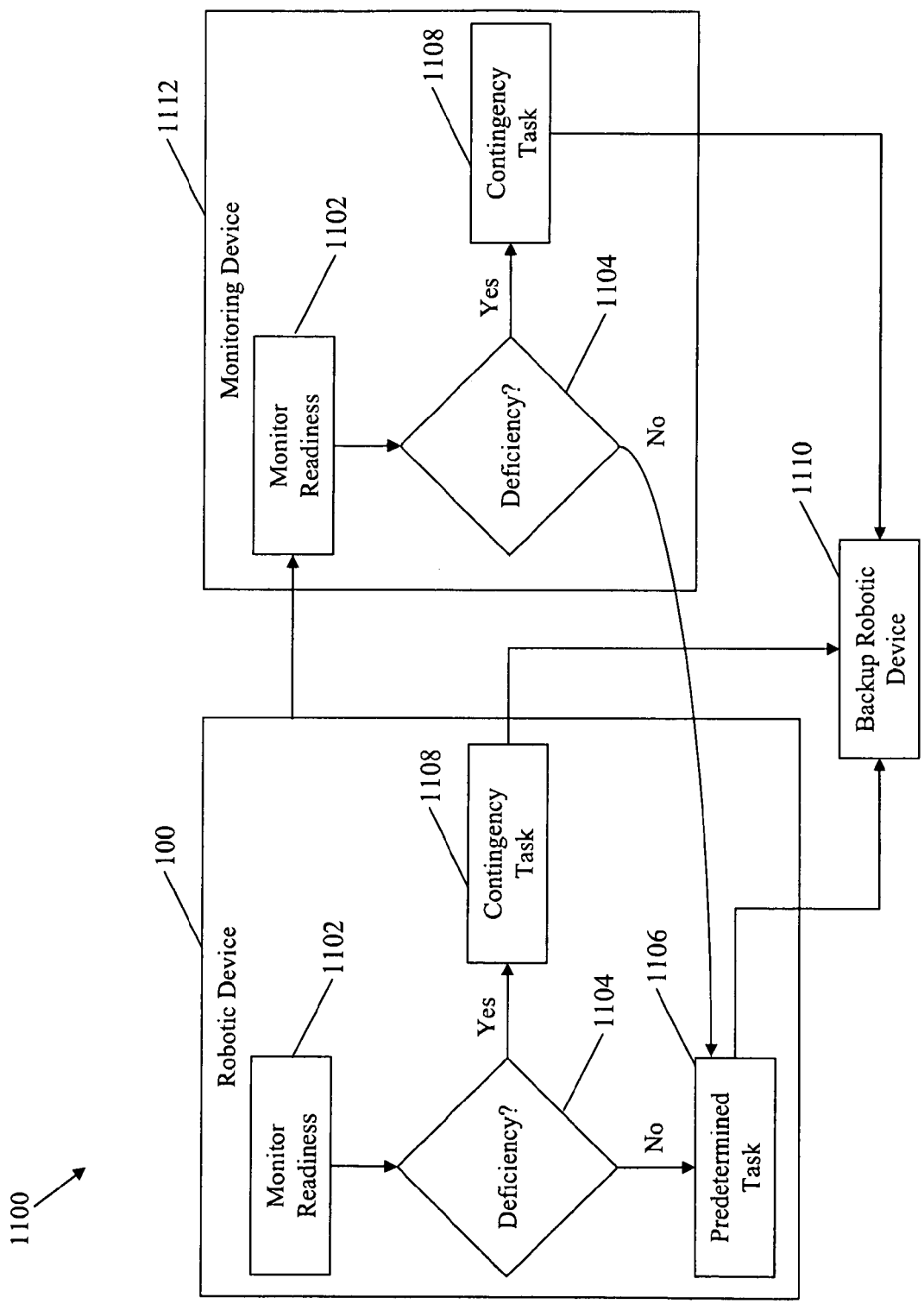
FIG. 11 is a flowchart that depicts a method for monitoring a robotic device in accordance with an embodiment of the invention.

In brief overview, FIG. 11 depicts a method 1100 for operating robotic devices in accordance with an embodiment of the invention, so as to monitor their operational readiness to complete at least one predetermined task 1106. In one embodiment, a robot 100 monitors its operational readiness (step 1102). The robot 100 then checks for a deficiency (step 1104) in its capabilities to perform the predetermined task 1106. If no deficiencies are identified, the robot 100 performs the task 1106. On the other hand, if one or more deficiencies are detected, the robot 100 performs a contingency task 1108 that is based at least in part on the deficiency. An example deficiency that the robot 100 can detect is a reduced capacity (i.e., level) of its power supply 144. In this case, the contingency task 1108 includes the robot 100 returning to a charging station that will replenish the power supply 144.

The deficiency may also include an operational failure, i.e., the inability to complete the predetermined task 1106 due to, for example, a hardware failure. In any instance where the robot 100 detects a deficiency, the contingency task 1108 can include the transmission of an out of service message to, for example, one or more backup robots 1110. These backup robots are typically capable of performing the predetermined task 1106 in the absence of the robot 100. On reception of the out of service message, one or more of these backup robots 1110 generally assume the position of the stricken robot 100 and endeavor to complete the predetermined task 1106.

In another embodiment, a monitoring device 1112 monitors (e.g., remotely) the operational readiness of the robot 100 (step 1102) and detects any deficiencies therein (step 1104). Similar to the embodiment described above, the robot 100 performs the predetermined task 1106 if no deficiencies are present; otherwise the contingency task is performed (step 1108). Nevertheless, by including the monitoring device 1112, instances where the robot 100 is unable to transmit notice of its deficiency (e.g., send the out of service message) before becoming disabled are addressed. For example, the robot 100 may suffer an abrupt and unexpected failure and be unable to transmit the out of service message. Typically, the monitoring device 1112 interrogates each robot periodically and, if robot 100 fails to respond after a certain number of attempts, the monitoring device 1112 will conclude that robot 100 is disabled. Processing this as a deficiency, the monitoring device 1112 then executes the contingency task 1108. The contingency task may include engaging one or more backup robots 1110 to complete the predetermined task 1106. Note that the monitoring device 1112 need not be a centralized transceiver in communication with several robots. On the contrary, in some embodiments, the monitoring device may be a robot (designated a "leader robot") tasked with observing the operational readiness of one or more robots 100.

One feature of the aforementioned embodiments to monitor operational readiness is that robot 100 is typically autonomous with respect to managing deficiencies. In other words, once the robot 100 or the monitoring device 1112 identifies a deficiency, one or more robots react to remedy the deficiency generally without intervention. The value of this feature becomes apparent when the number of robots increases to a point where it is too large to permit individualized monitoring and control of each robot by, for example, a human operator using a centralized control apparatus.

In another embodiment, monitoring is accomplished in cooperation with the transmitting apparatus 106. A robot 100 is configured to emit optical signals, or audio signals, or both using the optical transmitter 130, or the audio transmitter 132, respectively. These signals correspond at least in part to the state of the robot 100 and, therefore, may be considered state data. If these signals are observable (e.g., by a human operator), any inconsistencies therein may be readily discernable as, for example, an unexpected series of patterns in indicator lights. Further, the audio signal representing the state of several robots working cooperatively may be relatively uniform. A robot with inconsistent state data typically emits a different audio signal, thereby calling attention to itself. The capability to emit signals that allow an operator to discern operational inconsistencies between robots facilitates debugging, monitoring, and operation of the robot group. The value of this is apparent when the number of robots increases making it difficult to monitor the progress of each by conventional means.

Figure 12:
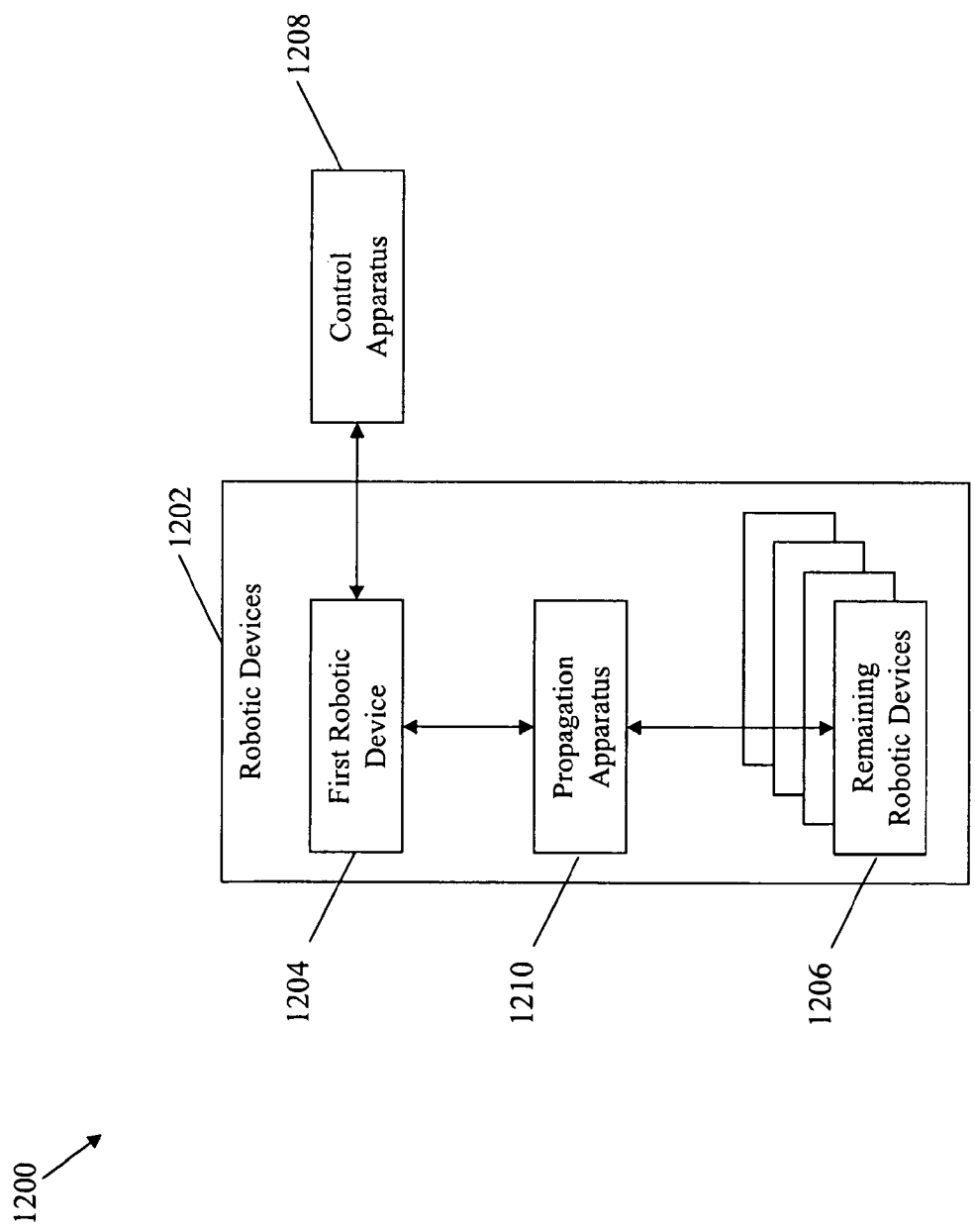
FIG. 12 is a flowchart that depicts a method for communicating with robotic devices in accordance with an embodiment of the invention.

As discussed above regarding the shape formation multi-device primitive command 204, computer code may be downloaded into one or more robots. FIG. 12 depicts a method 1200 for downloading and propagating this code among several robots 1202 in accordance with an embodiment of the invention. In this embodiment, a central control apparatus 1208 includes a central transmitter and a computer running software like that described above regarding FIG. 3. The central control apparatus 1208 typically communicates with a first robot 1204 out of the several robots 1202, sending configuration data to the first robot 1204. Configuration data, which are included in the configuration primitive category of multi-device primitive commands 204, typically include settings and other parameters that direct the first robot 1204 to receive new programming. The new programming (i.e., code) is also included in the configuration data.

The control apparatus 1208 can continue transmitting the configuration data until all robots 1202 acknowledge receipt. Nevertheless, in one embodiment, efficiency is increased by limiting this transmission so it is directed to the first robot 1204. The first robot 1204 then transmits the configuration data to the remaining robots 1206 within the group of robots 1202. The transmission from the first robot 1204 to the remaining robots 1206 is managed by a propagation apparatus 1210. The propagation apparatus 1210 typically includes the transmitting apparatus 106 to convey this transmission. In one embodiment, the configuration data includes a signal propagation hierarchy that prescribes the order in which the remaining robots 1206 are to be configured. In this case, the propagation apparatus 1210 detects and processes the hierarchy information and configures its transmitting apparatus 106 to ensure that the specified remaining robots 1206 are accessed and configured in the specified (i.e., predetermined) sequence. The hierarchy can also command that all robots 1202 stand ready to receive the configuration data at the same time.

Propagation of the configuration data may occur from the first robot 1204 to the remaining robots 1206, as described above. Alternatively, the propagation may be from the first robot 1204 to only one of the remaining robots 1206. That one remaining robot may then, in turn, propagate the configuration data to yet another one of the remaining robots 1206. This autonomous process can repeat, and eventually all of the remaining robots 1206 can receive the configuration data. Clearly, this represents an increase in efficiency because it relieves the control apparatus 1208 from the task of potentially downloading configuration data several times to ensure all of the robots 1202 acknowledge receipt.

In a related embodiment, the propagation of the configuration data includes selective processing of the configuration data. For example, certain of the remaining robots 1206 may be in reception range of the transmitted configuration data, but they may not need all of the configuration data. Consequently, these robots having only a partial need typically receive all of the configuration data but only process and implement the needed portion. In other words, these robots "listen in" on the entire transmission, identify those portions having needed data (e.g., modules of revised code), and process it accordingly.

Robots with the capabilities like those described above are able to perform many different tasks. The commands permit autonomous operation, meaning these robots can perform the tasks with little or no outside intervention. Thus, the embodiments of the invention described herein provide systems and methods that allow "hands off" functionality. The value of this feature becomes apparent when the number of robots increases such that individual control of each is unmanageable. Consequently, tasks such as data collection, mapping, and searching may be completed with large numbers of robots that, on receipt of multi-device primitive commands 204, engage in cooperative behaviors to achieve certain goals.

In addition to the above, further details are available in the following progress reports submitted to the Defense Advanced Research Projects Agency ("DARPA"):

Report dated Mar. 20, 2001, under contract number N66001-99-C-8513;

Report dated May 31, 2002, under contract number N66001-99-C-8513;

Report covering May 1, 2002 to Jul. 31, 2002, under contract number DASG60-02-C-0028;

Report for Period Aug. 1, 2002 to Nov. 30, 2002, under contract number DASG60-02-C-0028; and Report for Period Nov. 1, 2002 to Jan. 31, 2003, under contract number DASG60-02-C-0028.

These progress reports are incorporated herein by reference, in their entirety.

From the foregoing, it will be appreciated that the methods of operating and monitoring robotic devices provided by the invention afford a simple and effective way to deploy and retrieve several robots to complete a task. Robots according to embodiments of the invention are able to interact with each other, sense ambient conditions, and adapt their behavior accordingly to drive the task to completion. This increases efficiency and does not overburden a central command and control apparatus or operator.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for operating a plurality of devices, the method comprising the steps of:
    transmitting a wireless signal from an autonomous mobile robotic device to a second device, the wireless signal comprising a command to turn on the second device, and each of the robotic device and the second device being battery-operated; and
    turning on the second device following receipt of the wireless signal thereat.

2. The method of claim 1, wherein the wireless signal is selected from the group consisting of an infrared signal, a radio frequency signal, and an audio signal.

3. The method of claim 1, wherein the second device comprises a mobile device.

4. The method of claim 1, wherein the robotic device comprises a locomotion apparatus.

5. The method of claim 4, wherein the locomotion apparatus comprises at least one of wheels, a motor, and gearing.

6. The method of claim 1, wherein the robotic device comprises a sensor.

7. The method of claim 6, wherein the sensor comprises a tactile sensor for detecting an external mechanical contact force.

8. The method of claim 7 further comprising the step of using the robotic device and the second device to create a map of an environment within which the robotic device is operating.

9. The method of claim 1, wherein the robotic device comprises an indicator light.

10. The method of claim 1, where the second device comprises an indicator light.

11. The method of claim 1, wherein at least a portion of the second device is powered prior to receiving the wireless signal thereat, thereby permitting the second device to receive the command to turn on.

12. A system comprising:
    (a) a battery-operated autonomous mobile robotic device comprising:
        (i) a locomotion apparatus; and
        (ii) a transmitter for transmitting a wireless signal; and
    (b) a battery-operated second device comprising:
        (i) a receiver for receiving the wireless signal from the robotic device, the wireless signal comprising a command to turn on the second device; and
        (ii) a processing apparatus for turning on the second device following receipt of the wireless signal thereat.

13. The system of claim 12, wherein the transmitter is selected from the group consisting of an optical transmitter for transmitting an infrared signal, a radio frequency transmitter for transmitting a radio frequency signal, and an audio transmitter for transmitting an audio signal.

14. The system of claim 12, wherein the receiver is selected from the group consisting of an optical receiver for receiving an infrared signal, a radio frequency receiver for receiving a radio frequency signal, and an audio receiver for receiving an audio signal.

15. The system of claim 12, wherein the wireless signal is selected from the group consisting of an infrared signal, a radio frequency signal, and an audio signal.

16. The system of claim 12, wherein the second device comprises a mobile device.

17. The system of claim 12, wherein the locomotion apparatus comprises at least one of wheels, a motor, and gearing.

18. The system of claim 12, wherein the robotic device further comprises a sensor.

19. The system of claim 18, wherein the sensor comprises a tactile sensor for detecting an external mechanical contact force.

20. The system of claim 19, wherein the robotic device is configured to create a map of an environment within which the robotic device is operating.

21. The system of claim 12, wherein the robotic device further comprises an indicator light.

22. The system of claim 12, wherein the second device further comprises an indicator light.

23. The system of claim 12, wherein at least a portion of the second device is powered to enable the receiver to receive the wireless signal thereat.

24. The system of claim 12, wherein the robotic device further comprises a battery.

25. The system of claim 12, wherein the second device further comprises a battery.

* * * * *